US011897993B2

(12) United States Patent
Tang et al.

(10) Patent No.: US 11,897,993 B2
(45) Date of Patent: Feb. 13, 2024

(54) FLAME RETARDED POLYURETHANE FOAM

(71) Applicant: Albemarle Corporation, Charlotte, NC (US)

(72) Inventors: Yong Tang, Baton Rouge, LA (US); Augusto Caesar Ibay, Baton Rouge, LA (US)

(73) Assignee: ALBEMARLE CORPORATION, Charlotte, NC (US)

( * ) Notice: Subject to any disclaimer, the term of this patent is extended or adjusted under 35 U.S.C. 154(b) by 136 days.

(21) Appl. No.: 16/625,117

(22) PCT Filed: Jun. 26, 2018

(86) PCT No.: PCT/US2018/039562
§ 371 (c)(1),
(2) Date: Dec. 20, 2019

(87) PCT Pub. No.: WO2019/005837
PCT Pub. Date: Jan. 3, 2019

(65) Prior Publication Data
US 2020/0140601 A1 May 7, 2020

Related U.S. Application Data

(60) Provisional application No. 62/608,206, filed on Dec. 20, 2017, provisional application No. 62/564,522, filed on Sep. 28, 2017, provisional application No. 62/525,596, filed on Jun. 27, 2017.

(51) Int. Cl.
C08G 18/42 (2006.01)
C08G 18/40 (2006.01)
C08G 18/48 (2006.01)
C08K 5/05 (2006.01)
C08K 5/00 (2006.01)
C08G 18/28 (2006.01)
C08K 3/016 (2018.01)
C08G 18/38 (2006.01)
C08G 18/66 (2006.01)
C08G 18/76 (2006.01)
C08K 9/06 (2006.01)
C08K 3/34 (2006.01)

(52) U.S. Cl.
CPC ........ C08G 18/4211 (2013.01); C08G 18/282 (2013.01); C08G 18/381 (2013.01); C08G 18/3857 (2013.01); C08G 18/3868 (2013.01); C08G 18/4018 (2013.01); C08G 18/4829 (2013.01); C08G 18/6696 (2013.01); C08G 18/7657 (2013.01); C08K 3/016 (2018.01); C08K 5/0066 (2013.01); C08K 5/05 (2013.01); C08K 9/06 (2013.01); C08G 2110/005 (2021.01); C08G 2110/0025 (2021.01); C08K 3/346 (2013.01)

(58) Field of Classification Search
CPC .................................................. C08G 18/3857
See application file for complete search history.

(56) References Cited

U.S. PATENT DOCUMENTS

| 3,283,013 | A |   | 11/1966 | Rimmer |
|---|---|---|---|---|
| 3,334,032 | A | * | 8/1967 | Kardos ..................... C25D 3/12 205/271 |
| 3,467,607 | A |   | 9/1969 | Kuryla et al. |
| 3,487,040 | A |   | 12/1969 | Jolles |
| 3,542,740 | A |   | 11/1970 | Pumpelly et al. |
| 3,637,813 | A |   | 1/1972 | D'Alelio |
| 3,780,144 | A |   | 12/1973 | D'Alelio |
| 3,932,181 | A | * | 1/1976 | Ray-Chaudhuri ... G03G 5/0589 430/87 |
| 3,933,690 | A |   | 1/1976 | D'Alelio et al. |
| 3,950,392 | A |   | 4/1976 | D'Alelio |
| 3,993,690 | A |   | 11/1976 | Suvorov et al. |
| 4,002,580 | A |   | 1/1977 | Russo |
| 4,022,718 | A |   | 5/1977 | Russo |
| 4,052,346 | A | * | 10/1977 | Rudner .............. C08G 18/2885 528/49 |
| 4,559,366 | A |   | 12/1985 | Hostettler |
| 4,697,029 | A |   | 9/1987 | Collin et al. |
| 4,745,133 | A |   | 5/1988 | Grinbergs et al. |
| 4,898,981 | A |   | 2/1990 | Falk et al. |
| 6,518,324 | B1 | * | 2/2003 | Kresta .................... C08K 3/346 521/142 |
| 7,572,837 | B2 |   | 8/2009 | Kometani et al. |
| 7,671,105 | B2 |   | 3/2010 | Krupa et al. |
| 7,862,749 | B2 |   | 1/2011 | Sjerps |

(Continued)

FOREIGN PATENT DOCUMENTS

| CA | 2182714 A1 | 2/1997 |
|---|---|---|
| CN | 1179440 A | 4/1998 |

(Continued)

OTHER PUBLICATIONS

Machine Translation of CN105837781A. Aug. 10, 2016. (Year: 2016).*
Machine Translation of JPH09-039104A. Feb. 10, 1997. (Year: 1997).*
Machine Translation of CN102391766A. Mar. 28, 2012. (Year: 2012).*
Lanxess. PHT4-DIOL LV Reactive Halogenated Flame Retardant. Data Sheet. May 26, 2016. (Year: 2016).*
European Chemicals Agency (ECHA). Reaction products of tetrabromophthalic anhydride with 2,2'-oxydiethanol and methyloxirane. https://echa.europa.eu/registration-dossier/-/registered-dossier/26127. As viewed on Mar. 9, 2022. (Year: 2022).*
Application EP17179783.0, filed Jul. 5, 2017. (Year: 2017).*

(Continued)

Primary Examiner — Stephen E Rieth
(74) Attorney, Agent, or Firm — Mary H. Drabnis; R. Andrew Patty, II; Phelps Dunbar LLP

(57) ABSTRACT

This invention provides flame retardant compositions comprised of or formed from components comprising a sulfur-containing compound and at least one isocyanate-reactive brominated flame retardant.

12 Claims, 2 Drawing Sheets

(56) References Cited

U.S. PATENT DOCUMENTS

| | | | |
|---|---|---|---|
| 8,877,825 B2 | 11/2014 | Komentani et al. | |
| 9,434,884 B2 | 9/2016 | Lubnin et al. | |
| 2002/0107422 A1 | 8/2002 | Doi et al. | |
| 2003/0092786 A1 | 5/2003 | Brassat et al. | |
| 2003/0153656 A1 | 8/2003 | Sjerps | |
| 2006/0135636 A1 | 6/2006 | Zhu et al. | |
| 2009/0149561 A1 | 6/2009 | Worku et al. | |
| 2012/0248371 A1* | 10/2012 | Ross | C08G 18/26 252/182.15 |
| 2013/0197159 A1* | 8/2013 | Anater | C08G 18/7664 524/786 |
| 2013/0217286 A1 | 8/2013 | Lubnin et al. | |
| 2014/0005288 A1 | 1/2014 | Chen et al. | |
| 2014/0171525 A1* | 6/2014 | Yu | C08G 18/163 521/106 |
| 2014/0220333 A1 | 8/2014 | Bogdan et al. | |
| 2015/0025164 A1 | 1/2015 | Golini et al. | |
| 2016/0251491 A1 | 9/2016 | Okada et al. | |
| 2017/0247496 A1 | 8/2017 | Wang et al. | |
| 2021/0095072 A1* | 4/2021 | Ruebenacker | C08G 18/225 |

FOREIGN PATENT DOCUMENTS

| | | | | |
|---|---|---|---|---|
| CN | 10 1092535 A | | 12/2007 | |
| CN | 102391766 A | * | 3/2012 | |
| CN | 10 2964562 A | | 3/2013 | |
| CN | 10 3102844 A | | 5/2013 | |
| CN | 10 3665915 A | | 3/2014 | |
| CN | 10 6380600 A | | 2/2016 | |
| CN | 10 5860505 A | | 8/2016 | |
| CN | 105837781 A | * | 8/2016 | |
| CN | 10 6280451 A | | 1/2017 | |
| CN | 10 6317873 A | | 1/2017 | |
| DE | 2344254 A1 | | 3/1974 | |
| EP | 0 757 068 B1 | | 12/1999 | |
| EP | 1 756 224 B1 | | 10/2007 | |
| GB | 2 019 858 A | | 11/1979 | |
| JP | 09039104 A | * | 2/1997 | |
| PL | 198605 B1 | | 7/2008 | |
| TW | 200300145 A | | 5/2003 | |
| TW | 200815489 A | | 4/2008 | |
| TW | 200936664 A | | 9/2009 | |
| TW | 201117877 A | | 6/2011 | |
| WO | WO-2015041552 A2 | * | 3/2015 | C08G 18/2081 |
| WO | WO-2018111750 A1 | * | 6/2018 | C08G 18/092 |
| WO | 2019/067047 A1 | | 4/2019 | |

OTHER PUBLICATIONS

Machine translation of application EP17179783.0, filed Jul. 5, 2017. (Year: 2017).*

Gharibyan, H. A., et al., "Hydroalumination -Bromination of Acetylenic α-Alcohols", Hayastani Kimiakan Handes, 2009, vol. 62, pp. 369-377.

Kodomari, M., et al., "Stereoselective Bromination of Acetylenes with Bromine in the Presence of Graphite", Bull. Chem. Soc. Jpn., 1989, vol. 62, pp. 4053-4054.

Schuh, Kerstin, et al., "A Domino Copper-Catalyzed C—N and C—O Cross-Coupling for the Conversion of Primary Amides into Oxazoles", Synthesis, 2007, pp. 2297-2306.

ICL Industrial Products. (2012). "Fire Safety in Construction and Building with ICL-IP Solutions", product brochure, 6 pages.

Sigma-Aldrich. "2,3-Dibromo-1-propanol", product information, www.sigmaaldrich.com/catalog/product/aldrich/d43050?lang=en&region=US, website visited Dec. 15, 2020, 3 pages.

Great Lakes Solutions, Firemaster 520 "Reactive Halogenated Flame Retardant", Technical Information brochure, 2010, Chemtura Corporation, 1 page.

* cited by examiner

FLAME RETARDED POLYURETHANE FOAM

REFERENCE TO RELATED APPLICATIONS

This application is the National Stage of International Patent Appln. No. PCT/US2018/039562 filed on Jun. 26, 2018, which in turn claims the benefit of U.S. Provisional Patent Appln. No. 62/525,596, filed on Jun. 27, 2017, U.S. Provisional Patent Appln. No. 62/564,522, filed on Sep. 28, 2017, and U.S. Provisional Patent Appln. No. 62/608,206, filed on Dec. 20, 2017, the disclosures of which are incorporated herein by reference.

TECHNICAL FIELD

This invention relates to flame retarded rigid polyurethane foams, and to compositions which can be used in forming such foams.

BACKGROUND

Rigid polyurethane foam is processed using a cast process or spray process. The cast process is generally utilized for block foam production, continuous double band lamination, and discontinuous panel production. Spray polyurethane foam has been used as a roofing insulation and sealing product for many years. Spray polyurethane foam adheres to and also forms to the walls and floors to create a tight seal and insulating barrier that stops air leakage.

Fire resistance is an important property of these materials. Various compounds or mixtures thereof have been used effectively to meet applicable fire safety standards. However, in addition to effectiveness as flame retardants, it is desired to provide compounds and/or mixtures that are compatible with the foam manufacturing processes, and do not migrate out of the polyurethane foam over time.

SUMMARY OF THE INVENTION

This invention provides compositions and processes for producing flame retardant polyurethane foams, which are generally closed-celled, rigid polyurethane foams. Also provided are formulations that can be used to make flame retardant rigid polyurethane foams.

An embodiment of this invention is a flame retardant composition which is comprised of or formed from components comprising at least one isocyanate-reactive sulfur-containing compound and at least one isocyanate-reactive brominated flame retardant.

Other embodiments of this invention include formulations, processes for forming rigid polyurethane foams, and rigid polyurethane foams.

These and other embodiments and features of this invention will be still further apparent from the ensuing description and appended claims.

FURTHER DETAILED DESCRIPTION OF THE INVENTION

Figure 1B:
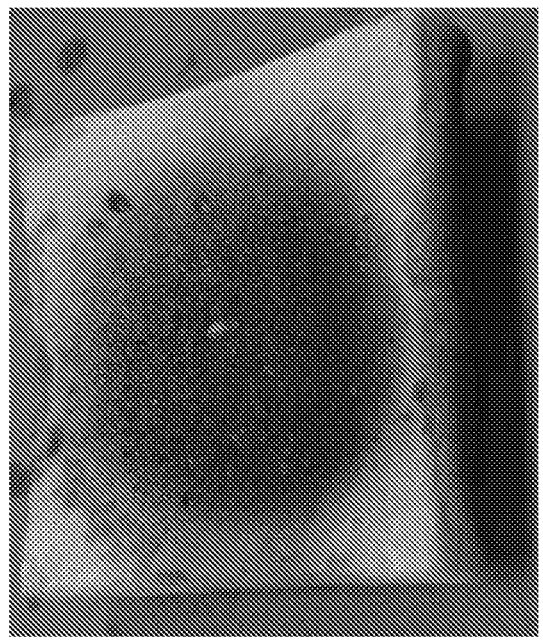
FIG. 1B is a photograph showing the char on the underside of a rigid polyurethane foam square formed from ingredients including E-300, RB-79, and a nanoclay.

As used throughout this document, the phrase "reactive brominated flame retardant" has equivalent meaning to "isocyanate-reactive brominated flame retardant." Similarly, the phrase "reactive sulfur-containing compound" has equivalent meaning to "isocyanate-reactive sulfur-containing compound" as used throughout this document.

The reactive sulfur-containing compounds used pursuant to this invention are isocyanate-reactive sulfur-containing compounds which contain at least one functional group which is available for, and capable of, reacting with another polyurethane-forming component during polyurethane formation so that the resultant polyurethane contains the reactive brominated flame retardant in chemically-bound form. It is believed that the functional groups of the reactive sulfur-containing compound react with isocyanate groups during the preparation of polyurethane foam. The isocyanate-reactive groups are typically amine groups (primary or secondary) and/or hydroxyl groups. In some embodiments, it is preferred that there are two isocyanate-reactive groups.

One or more sulfur atoms are present in the sulfur-containing compound; often, there are two sulfur atoms in the molecule. When the reactive sulfur-containing compound has two or more sulfur atoms, the sulfur atoms may be adjacent to one another, or may be spaced apart by one or more other atoms in the molecule. The organic portion of the molecule can be aliphatic (straight chain, branched, or cyclic), aromatic, alk-aromatic, or a mixture of these.

In various embodiments of the invention, the isocyanate-reactive sulfur-containing compounds are disulfides, especially where the organic portion of the disulfide is an aliphatic straight chain, and sulfur-containing aromatic diamines.

In some embodiments, the reactive sulfur-containing compound is one or more sulfur-containing aromatic diamines. The sulfur-containing aromatic diamines used pursuant to this invention are in the form of a benzene ring having two primary amino groups, two methylthio groups, and a methyl group on the ring. The amino groups are at the 3 and 5 positions on the ring; the methyl group is in the 1 position; and the methylthio groups are in either the 2 and 4 or the 2 and 6 positions on the ring. Sulfur-containing aromatic diamines are typically sold commercially as a chain extenders or curatives for use in polyurethane formation.

Those of skill in the art will recognize that there are several ways to name sulfur-containing aromatic diamines. For example, 3,5-dimethylthio-toluene-2,4-diamine can be called 2,4-dimethylthio-6-methyl-1,3-benzenediamine, 2,4-dimethylthio-6-methyl-1,3-phenylenediamine, or 3,5-dimethylthio-2,4-diaminotoluene. The sulfur-containing aromatic diamines are 3,5-dimethylthio-toluene-2,4-diamine, 3,5-dimethylthio-toluene-2,6-diamine, and mixtures thereof. When a mixture is used, the two sulfur-containing aromatic diamines can be in any amount relative to each other, often ranging from about 90:10 to 10:90, and preferably about 20:80 to 80:20 by weight of 3,5-dimethylthio-toluene-2,4-diamine to 3,5-dimethylthio-toluene-2,6-diamine.

Preferred in the practice of this invention is a mixture of 3,5-dimethylthio-toluene-2,4-diamine and 3,5-dimethylthio-toluene-2,6-diamine, which is commercially available from Albemarle Corporation as Ethacure® 300 curative (E-300), typically having about 75 wt % to about 85 wt % 3,5-dimethylthio-toluene-2,4-diamine and about 15 wt % to about 25 wt % of 3,5-dimethylthio-toluene-2,6-diamine.

In other embodiments, the reactive sulfur-containing compound is a disulfide, preferably in which the organic portion is an aliphatic straight chain, and the reactive groups are hydroxy groups. Preferably, each aliphatic portion has one to about ten carbon atoms, more preferably one to about six carbon atoms. A preferred disulfide is bis(2-hydroxyethyl)disulfide, which is also called 2-hydroxyethyl disulfide or 2,2'-dithiodiethanol, and is sometimes abbreviated herein as BHEDS.

An isocyanate-reactive brominated flame retardant contains at least one functional group which is available for, and capable of, reacting with another polyurethane-forming component during polyurethane formation so that the resultant polyurethane contains the reactive brominated flame retardant in chemically-bound form. It is believed that the functional groups of the reactive brominated flame retardant react with isocyanate groups during the preparation of polyurethane foam; usually, the functional (reactive) groups in the reactive brominated flame retardants are hydroxyl groups.

Suitable isocyanate-reactive brominated flame retardants in the practice of this invention include brominated aromatic diester diols, 2,3-dibromoallyl alcohol, tribromoneopentyl alcohol, dibromoneopentyl glycol and tetrabromobenzenedimethanol In some embodiments, 2,3-dibromoallyl alcohol, tribromoneopentyl alcohol, and/or a brominated aromatic diester diol are preferred isocyanate-reactive brominated flame retardants.

Brominated aromatic diester diols in the practice of this invention are liquid diol esters of polybromophthalic acid or anhydride, where the aromatic moiety has 1 to 4, preferably 2 to 4, more preferably 4, bromine atoms. Examples of such compounds are a mixed ester of tetrabromophthalic anhydride with diethylene glycol and propylene glycol (Saytex® RB-79 flame retardant, Albemarle Corporation). Methods for manufacturing such compounds are described for example in U.S. Pat. No. 4,564,697.

The reactive brominated flame retardant 2,3-dibromo-2-propen-1-ol is often referred to as 2,3-dibromoallyl alcohol or DBAA. DBAA is a known molecule, but is not commercially available. Synthesis of DBAA from propargyl alcohol (2-propyn-1-ol) and elemental bromine ($Br_2$) at room temperature in a solvent is known.

Tribromoneopentyl alcohol is commercially available, and is also referred to as pentaerythritol tribromide and as 2,2-bis(bromomethyl)-3-bromo-propan-1-ol.

Dibromoneopentyl glycol is commercially available, and is also referred to as pentaerythritol dibromide and as 2,2-bis(bromomethyl)-3-bromo-propan-1-ol.

Tetrabromobenzenedimethanol is also called tetrabromo(hydroxymethyl)phenyl-methanol and tetrabromo-xylenediol. More properly, tetrabromobenzenedimethanol is named 2,3,5,6-tetrabromobenzene-1,3-dimethanol, or {2,3,5,6-tetrabromo-4-(hydroxymethyl)phenyl}methanol, or 2,3,5,6-tetrabromo-p-xylene-α,α'-diol. While the ortho and meta isomers are known and usable, the para isomer is typically used, and is commercially available.

In the flame retardant composition, when the reactive sulfur-containing compound is one or more sulfur-containing aromatic diamines, the relative amount of the isocyanate-reactive brominated flame retardant to the sulfur-containing aromatic diamine is typically in the range of about 0.2:1 to about 6:1 by weight, preferably about 1:1 to about 6:1. In some embodiments, the relative amount of the reactive brominated flame retardant to the sulfur-containing aromatic diamine is typically in the range of about 1.5:1 to about 4:1 by weight; in other embodiments, the relative amount of the brominated aromatic diester diol to the sulfur-containing aromatic diamine is typically in the range of about 3:1 to about 5:1 by weight.

When the reactive sulfur-containing compound in the flame retardant composition is one or more disulfides, the relative amount of the isocyanate-reactive brominated flame retardant to the disulfide is typically in the range of about 0.75:1 to about 5:1 by weight, preferably about 1:1 to about 4:1.

When the reactive sulfur-containing compound is one or more sulfur-containing aromatic diamines, amounts of the sulfur-containing aromatic diamine in the flame retardant composition in some embodiments are in an amount of about 10 wt % to about 45 wt %, preferably about 15 wt % to about 30 wt %, relative to the total weight of the flame retardant composition. In other embodiments, amounts of the sulfur-containing aromatic diamine in the flame retardant composition are about 0.5 wt % to about 10 wt %, preferably about 1 wt % to about 7 wt %, relative to the total weight of the flame retardant composition.

In some embodiments in which the reactive sulfur-containing compound is one or more sulfur-containing aromatic diamines, amounts of the isocyanate-reactive brominated flame retardant in the flame retardant composition are in an amount of about 45 wt % to about 80 wt %, preferably about 50 wt % to about 75 wt %, relative to the total weight of the flame retardant composition. More preferably, when the reactive brominated flame retardant is DBAA, the amount is about 50 wt % to 65 wt %, relative to the total weight of the flame retardant composition; when the reactive brominated flame retardant is a brominated aromatic diester diol, the amount is about 55 wt % to 75 wt %, relative to the total weight of the flame retardant composition.

In other embodiments, amounts of the isocyanate-reactive brominated flame retardant, especially brominated aromatic diester diols, in the flame retardant composition are in an amount of about 5 wt % to about 30 wt %, preferably about 10 wt % to about 20 wt %, relative to the total weight of the flame retardant composition.

When the reactive sulfur-containing compound is a disulfide, amounts of the disulfide in the flame retardant composition in some embodiments are about 10 wt % to about 55 wt %, preferably about 15 wt % to about 25 wt %, relative to the total weight of the flame retardant composition. In other embodiments, the disulfide amount is preferably about 45 wt % to about 85 wt %, relative to the total weight of the flame retardant composition.

In still other embodiments, amounts of the isocyanate-reactive brominated flame retardant, especially DBAA, in the flame retardant composition are in an amount of about 60 wt % to about 90 wt %, preferably about 75 wt % to about 90 wt %, relative to the total weight of the flame retardant composition, especially when the reactive sulfur-containing compound is a disulfide.

The flame retardant composition may further comprise tris(1-chloro-2-propyl)phosphate, sometimes referred to as tris(2-chloropropyl)phosphate, especially when the reactive sulfur-containing compound is one or more sulfur-containing aromatic diamines. When present, the tris(1-chloro-2-propyl)phosphate is typically used in an amount of about 50 wt % to about 90 wt %, preferably about 60 wt % to about 85 wt %, more preferably about 70 wt % to about 85 wt %, relative to the total weight of the flame retardant composition. Tris(1-chloro-2-propyl)phosphate is preferably used in combination with a brominated aromatic diester diol.

Nanoclays in the flame retardant composition are surface-modified hydrophilic clays, preferably surface-modified montmorillonite nanoclays. More particularly, the nanoclays have been modified with an amine compound containing saturated hydrocarbyl groups preferably having about 8 to about 24 carbon atoms, and have an average particle size of about 25 microns or less, preferably about 20 microns or less, more preferably about 15 microns to about 20 microns. A preferred nanoclay is a montmorillonite clay surface modified with 0.5 to 5 wt % aminopropyltriethoxysilane and 15 to 35 wt % octadecylamine (Nanomer® I.31PS, Sigma-Aldrich). Nanoclays are generally present in an amount of about 0.5 wt % to about 5 wt %, preferably about 1 wt % to about 4 wt %, more preferably about 1 wt % to about 3 wt %, relative to the total weight of the flame retardant composition.

In some preferred embodiments, the flame retardant composition comprises a sulfur-containing aromatic diamine, an isocyanate-reactive brominated flame retardant, and either a nanoclay or tris(1-chloro-2-propyl)phosphate, preferably both a nanoclay and tris(1-chloro-2-propyl)phosphate, especially when the reactive brominated flame retardant is a brominated aromatic diester diol.

In other preferred embodiments, the flame retardant composition comprises a sulfur-containing aromatic diamine as the isocyanate-reactive sulfur-containing compound, and a brominated aromatic diester diol and tribromoneopentyl alcohol as the isocyanate-reactive brominated flame retardant. In still other preferred embodiments, the isocyanate-reactive sulfur-containing compound is a sulfur-containing aromatic diamine and the isocyanate-reactive brominated flame retardant is tribromoneopentyl alcohol or 2,3-dibromoallyl alcohol. More preferably, the sulfur-containing aromatic diamine in these embodiments is a mixture of 3,5-dimethylthio-toluene-2,4-diamine and 3,5-dimethylthio-toluene-2,6-diamine.

In another preferred embodiment, the isocyanate-reactive sulfur-containing compound is a sulfur-containing aromatic diamine and a disulfide, and the isocyanate-reactive brominated flame retardant is a brominated aromatic diester diol. More preferably, the sulfur-containing aromatic diamine in this embodiments is a mixture of 3,5-dimethylthio-toluene-2,4-diamine and 3,5-dimethylthio-toluene-2,6-diamine and the disulfide is bis(hydroxyethyl)disulfide.

In still another preferred embodiment, the isocyanate-reactive sulfur-containing compound is a disulfide and the isocyanate-reactive brominated flame retardant is a brominated aromatic diester diol, 2,3-dibromoallyl alcohol, and/or tribromoneopentyl alcohol, Preferred combinations include a disulfide and a brominated aromatic diester diol; a disulfide and 2,3-dibromoallyl alcohol; and a disulfide and tribromoneopentyl alcohol. More preferably, the disulfide in these embodiments is bis(hydroxyethyl)disulfide.

In an embodiment, in the flame retardant composition, the sulfur-containing aromatic diamine is a mixture of 3,5-dimethylthio-toluene-2,4-diamine and 3,5-dimethylthio-toluene-2,6-diamine, preferably in an amount of about 10 wt % to about 45 wt %; and the reactive brominated flame retardant is 2,3-dibromoallyl alcohol, preferably in an amount of about 50 wt % to about 75 wt %, more preferably about 50 wt % to about 65 wt %. All of the wt % values in this paragraph are relative to the total weight of the flame retardant composition.

In another embodiment, in the flame retardant composition, the sulfur-containing aromatic diamine is a mixture of 3,5-dimethylthio-toluene-2,4-diamine and 3,5-dimethylthio-toluene-2,6-diamine, preferably in an amount of about 0.5 to about 10 wt %; the reactive brominated flame retardant is a brominated aromatic diester diol which is a mixed ester of tetrabromophthalic anhydride with diethylene glycol and propylene glycol, preferably in an amount of about 5 wt % to about 30 wt %; and either tris(1-chloro-2-propyl)phosphate, preferably in an amount of about 50 wt % to about 90 wt %, or a surface-modified montmorillonite clay, preferably a montmorillonite clay surface modified with 0.5 to 5 wt % aminopropyltriethoxysilane and 15 to 35 wt % octadecylamine, are present, preferably in an amount of about 0.5 wt % to about 5 wt %. Preferably, both tris(1-chloro-2-propyl)phosphate and a surface-modified montmorillonite clay are present in the flame retardant composition. All of the wt % in this paragraph are relative to the total weight of the flame retardant composition.

In still another embodiment, in the flame retardant composition, the disulfide is bis(hydroxyethyl)disulfide, preferably in an amount of about 15 wt % to about 25 wt %; and the reactive brominated flame retardant is 2,3-dibromoallyl alcohol, preferably in an amount of about 75 wt % to about 90 wt %.

In yet another embodiment, in the flame retardant composition, the disulfide is bis(hydroxyethyl)disulfide, preferably in an amount of about 25 wt % to about 75 wt %; and the reactive brominated flame retardant is tribromoneopentyl alcohol, preferably in an amount of about 35 wt % to about 60 wt %.

In another embodiment, in the flame retardant composition, the disulfide is bis(hydroxyethyl)disulfide, preferably in an amount of about 10 wt % to about 60 wt %, more preferably about 15 to 55 wt %; and the reactive brominated flame retardant is a brominated aromatic diester diol, preferably in an amount of about 35 wt % to about 90 wt %, more preferably about 45 wt % to about 85 wt %.

Formulations of the invention, which can be used as the B side in processes for forming polyurethane foams, comprise a polyol, a blowing agent, a catalyst, a surfactant, and an isocyanate-reactive brominated flame retardant. When producing a formulation of the invention, the sulfur-containing aromatic diamine and the reactive brominated flame retardant can be introduced separately or in the form of a flame retardant composition of the invention.

When the reactive sulfur-containing compound is one or more sulfur-containing aromatic diamines, the amount of sulfur-containing aromatic diamine in the formulation is in the range of about 1 wt % to about 20 wt %, preferably in the range of about 2 wt % to about 15 wt %, and more preferably in the range of about 2 wt % to about 12 wt %, based on the total weight of the formulation.

In the formulation, the amount of isocyanate-reactive brominated flame retardant is in the range of about 1 wt % to about 25 wt %, preferably about 4 wt % to about 20 wt %, more preferably about 4 to about 15 wt %, based on the total weight of the formulation.

Tris(1-chloro-2-propyl)phosphate, when present in the formulation, is typically in an amount of about 20 wt % to about 60 wt %, preferably about 20 wt % to about 45 wt %, more preferably about 25 wt % to about 40 wt %, based on the total weight of the formulation.

Amounts of nanoclay in the formulations of this invention are in an amount of about 0.5 wt % to about 5 wt %, preferably about 1 wt % to about 4 wt %, more preferably about 1 wt % to about 3 wt %, based on the total weight of the formulation.

When the reactive sulfur-containing compound is a disulfide, the amount of disulfide in the formulation is in the range of about 1 wt % to about 15 wt %, preferably in the range of about 3 wt % to about 12 wt %, based on the total weight of the formulation.

Polyurethane foams are typically produced by contacting two main liquid components, viz., polyisocyanates (A side) and polyols (B side). It is desirable for the B side (here, the formulation of the invention), which contains all of the components other than the polyisocyanates, to be in the form of a liquid. As used herein, the term "liquid" means that the formulation is in the liquid state of aggregation at 22° C. Nanoclays are not liquids; however, when a nanoclay is included in the B-side formulation, the nanoclay remains suspended in solution for a minimum of several hours, at least on the laboratory scale.

In an embodiment, in the formulation, the reactive sulfur-containing compound is a sulfur-containing aromatic diamine which is a mixture of 3,5-dimethylthio-toluene-2,4-diamine and 3,5-dimethylthio-toluene-2,6-diamine, preferably in an amount of about 2 wt % to about 15 wt %; and the reactive brominated flame retardant is preferably in an amount of about 4 wt % to about 20 wt %; preferably, the reactive brominated flame retardant is 2,3-dibromoallyl alcohol or a mixed ester of tetrabromophthalic anhydride with diethylene glycol and propylene glycol with tris(1-chloro-2-propyl)phosphate, preferably in an amount of about 50 wt % to about 70 wt %, and/or a surface-modified montmorillonite clay, preferably montmorillonite clay surface modified with 0.5 to 5 wt % aminopropyltriethoxysilane and 15 to 35 wt % octadecylamine, preferably in an amount of about 1 wt % to about 4 wt %. Preferably, both tris(1-chloro-2-propyl)phosphate and a surface-modified montmorillonite clay are present in the formulation with the sulfur-containing aromatic diamine. All of the wt % in this paragraph are based on the total weight of the formulation.

In another embodiment, in the formulation, the reactive sulfur-containing compound is a disulfide which is bis(2-hydroxyethyl)disulfide, preferably in an amount of about 3 wt % to about 12 wt %; and the reactive brominated flame retardant is preferably in an amount of about 5 wt % to about 20 wt %; preferably, the reactive brominated flame retardant is 2,3-dibromoallyl alcohol or tribromoneopentyl alcohol. All of the wt % values in this paragraph are based on the total weight of the formulation.

The isocyanate-reactive brominated flame retardants become part of the polyurethane foam, along with the isocyanate-reactive sulfur-containing compounds. This provides the advantage that these components do not migrate out of the foam, in contrast to other compounds often used in polyurethane foams for flame retardant purposes.

The polyol or polyols used in forming the polyurethane foams in the practice of this invention can be any polyol that is typically used to produce rigid polyurethane foams. Often, mixtures of polyols are used, with the particular polyols selected for their effect on the properties of the polyurethane foam being formed.

The polyol usually is a polyol or mixture of polyols having hydroxyl numbers in the range of about 100 to about 850 mg KOH/g, preferably in the range of about 110 to about 600 mg KOH/g. When polymeric polyols are used, they typically have molecular weights in the range of about 250 to about 5000, often about 400 to about 3000.

Suitable polyols for forming polyurethane foams include polyether polyols, polyester polyols, aliphatic polyols, and polyoxyalkylene glycols. Mixtures of two or more polyols can be used. Preferred polyols for forming rigid polyurethane foams include polyester polyols.

Polyoxyalkylene glycols that can be used include polyoxyethylene glycol, polyoxypropylene glycol, and block and heteric polyoxyethylene-polyoxypropylene glycols.

The aliphatic polyols typically contain up to about 18 carbon atoms per molecule. Suitable aliphatic polyols include ethylene glycol, propylene glycol, the isomeric butylene glycols, diethylene glycol, 1,5-pentanediol, 1,6-hexanediol, triethylene glycol, glycerol, trimethylolethane, trimethylolpropane, 1,2,6-hexanetriol, pentaerythritol, tetraethylene glycol, dipentaerythritol, sorbitol, sucrose, and alpha-methylglycoside.

Polyether polyols are produced by reacting one or more alkylene oxides having 2 to about 8 carbons in the alkylene radical with an initiator molecule containing two or more hydroxyl groups. Suitable polyether polyols include sucrose/glycerine polyether polyol; sucrose polyether polyol based on glycerine, propylene oxide and ethylene oxide; glycerin-initiated polyether polyols, e.g., glycerine/propylene oxide polyether polyol; and mannich-based polyether polyols.

Polyester polyols are produced by polymerizing polycarboxylic acids or their derivatives, for example their acid chlorides or anhydrides, with a polyol. Suitable polyester polyols include aromatic polyester polyols and diethylene glycol-phthalic anhydride polyester polyol.

For forming rigid polyurethane foams, the amount of polyol typically ranges from about 40 wt % to about 80 wt %, and often from about 50 wt % to about 70 wt %, based on the total weight of the B side components (formulation). These amounts refer to the total amount of polyol in the formulation, when there is more than one polyol present.

The blowing agent is preferably present in an amount of about 5 to about 25 wt % of the total weight of the formulation; more preferably, the blowing agent is about 7.5 to about 20 wt % of the formulation. In some embodiments, the blowing agent is about 7.5 to about 15 wt % of the formulation; in other embodiments, the blowing agent is about 10 to about 20 wt % of the formulation.

Suitable blowing agents include water; halocarbons (fully halogenated chlorofluorocarbons), in particular trichlorofluoromethane (CFC-11); halohydrocarbons (hydrogen-containing chlorofluorocarbons, or HCFC's) such as 1,1-dichloro-1-fluoroethane (HCFC-141b), 1-chloro-1,1-difluoroethane (HCFC-142b), chlorodifluoromethane (HCFC-22), and trans-1-chloro-3,3,3-trifluoropropene (HFO-1233zd(E)); partially fluorinated hydrocarbons (HFC's) such as 1,1,1,3,3-pentafluoropropane (HFC-245fa), 1,1,1,2-tetrafluoroethane (HFC-134a), 1,1,1,3,3,3-hexafluoropropane (HFC-236fa), 1,1,2,3,3,3-hexafluoropropane (HFC-236ea), 1,1,1,4,4,4-hexafluorobutane (HFC-356mffm) and 1,2-bis(trifluoromethyl)ethene; and hydrocarbons such as n-pentane, isopentane, and cyclopentane. Mixtures of any two or more blowing agents can be used. Preferred blowing agents when forming rigid foams include water, 1,1,1,3,3-pentafluoropropane, trans-1-chloro-3,3,3-trifluoropropene, 1,2-bis(trifluoromethyl)ethene and mixtures of water with 1,1,1,3,3-pentafluoropropane, trans-1-chloro-3,3,3-trifluoropropene, or 1,2-bis(trifluoromethyl)ethene. In some instances, 2,3-dibromoallyl alcohol permits formulations in which water is the only blowing agent.

Types of catalysts that can be used in the practice of this invention include tertiary amines, tin catalysts, typically an organic tin compound, bismuth catalysts, other organometallic catalysts, and potassium salts of organic carboxylic acids. Mixtures of catalysts of the same type and/or different types can be used in the practice of this invention. The catalyst is preferably present in the formulation in an amount in the range of about 1 wt % to about 10 wt %, more preferably about 2.5 wt % to about 7.5 wt %, based on the total weight of the formulation. These amounts refer to the total amount of catalyst in the formulation, when there is more than one catalyst present.

In the tertiary amine catalysts, the groups on the tertiary amine are preferably alkyl groups; more preferably, the groups are oxygen-containing groups such as etheric or saturated alcoholic groups. Suitable tertiary amines include dimethylethyl amine, triethylenediamine, dimethylethylamine, dimethylcyclohexylamine, dimethylbenzylamine, tetramethyldipropylenetriamine, pentamethyldiethylenetriamine, tris(dimethylaminopropyl)hydrotriazine, 1-methyl-4-(2-dimethylaminoethyl)piperazine, 1,4-diaza(2,2,2)bicyclooctane, 3-methoxy-N,N-dimethylpropylamine, N-methylmorpholine, N-ethylmorpholine, N-cocomorpholine, bis(dimethylaminoethyl) ether, and ethanol amine catalysts, such as dimethylethanolamine, 2-(2-dimethylaminoethoxy)ethanol, and N,N,N'-trimethylaminoethyl-ethanol amine.

Types of tin compounds that can be used as catalysts include dialkyl(dialkylthio) stannanes, stannous(II) salts of organic carboxylic acids, and dialkyltin(IV) salts of carboxylic acids. Suitable tin catalysts in the practice of this invention include dibutylbis(dodecylthio) stannane, stannous(II) octoate, stannous(II) acetate, dibutyltin dilaurate, and dioctyltin diacetate.

Still another type of catalyst is one or more potassium salts of organic carboxylic acids. Suitable potassium salts include potassium acetate and potassium octoate.

A surfactant is often needed for production of polyurethane foam, and surfactants are normally used when forming polyurethane foams. Suitable silicone-based surfactants in the practice of this invention include silicone glycols, silicone glycol copolymers, polyether modified polysiloxanes, polyether modified dimethylpolysiloxanes such as a polyether polydimethylsiloxane copolymer, polysiloxane polyoxoalkylene coplymers, polysiloxane polyoxoalkylene coplymers, polysiloxane copolymers, and the like. Polyether modified dimethylpolysiloxanes are preferred silicone-based surfactants. The silicone-based surfactant is preferably present in the formulation in an amount in the range of about 0.5 wt % to about 5 wt %, more preferably about 0.75 wt % to about 3 wt %, based on the total weight of the formulation.

Other surfactants that can be used when forming rigid polyurethane foams include emulsifiers such as sodium salts of castor oil sulfates or fatty acids; fatty acid salts with amines, e.g., diethylamine oleate and diethanolamine stearate; salts of sulfonic acids, e.g., alkali metal or ammonium salts of e.g., dodecylbenzenedisulfonic acid and ricinoleic acid; ethoxylated alkylphenols, ethoxylated fatty alcohols; ether amine quaternary ammonia compounds; 2-hydroxypropyltrimethylammonium formate; sodium hydroxy-nonylphenyl-N-methylglycinate (the sodium salt of N-((2-hydroxy-5-nonylphenyl)methyl)-N-methyl-glycine), and castor oil.

One or more optional additives which can be included in a formulation of the invention include antioxidants, diluents, chain extenders or cross-linkers, synergists (preferably melamine), stabilizers, fungistats, pigments, dyes, fillers, antistatic agents, and plasticizers.

The components of the formulation can be combined in any order; preferably, the blowing agent is the last ingredient added. More preferably, the components of the flame retardant composition are combined with the polyol(s), followed by the surfactant, catalyst, and any optional ingredients, followed by the blowing agent.

The polyisocyanate (A-side component) used in forming the polyurethane foams in the practice of this invention include can be any polyisocyanate that can be used to produce rigid polyurethane foams. When a polymeric polyisocyanate is used, it preferably has an isocyanate (NCO) content of about 25 wt % to about 50 wt %, preferably about 25 wt % to about 40 wt %.

When forming rigid polyurethane foams, polyisocyanates are used, and the polyisocyanate can be aromatic or aliphatic. Suitable polyisocyanates for rigid polyurethane foams in the practice of this invention include, but are not limited to, 1,4-tetramethylene diisocyanate, 1,5-pentamethylene diisocyanate, 2-methyl-L5-pentamethylene diisocyanate, 1,6-hexamethylene diisocyanate (HMDI), 1,7-heptamethylene diisocyanate, 1,10-decamethylene diisocyanate, cyclohexylene diisocyanate, isophorone diisocyanate (IPDI), 4,4'-methylenedicyclohexyl diisocyanate (H12MDI), hexahydrotoluene diisocyanate and isomers thereof, 2,2,4-trimethylhexamethylene diisocyanate, 2,4,4-trimethylhexamethylene diisocyanate, 4,4'-methylenebis (cyclohexylisocyanate), phenylene diisocyanate, toluene diisocyanate (TDI), xylene diisocyanate, other alkylated benzene diisocyanates, toluene diisocyanate, 1,5-naphthalene diisocyanate, diphenylmethane diisocyanate (MDI, sometimes called methylene diisocyanate), 1-methoxyphenyl-2,4-diisocyanate, 4,4'-diphenylmethane diisocyanate, 2,4'-diphenylmethane diisocyanate, mixtures of 4,4'- and 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, 4,4',4"-triphenylmethane triisocyanate, toluene 2,4,6-triisocyanate, 4,4'-dimethyldiphenylmethane-2,2',5,5'-tetraisocyanate, polymeric polyisocyanates such as polymethylene polyphenylene polyisocyanate, and mixture of any two or more of the foregoing.

Polyisocyanates that can be used in forming rigid polyurethane foams of the present invention include those isocyanates commonly referred to as polymeric methylene diphenyl diisocyanate (MDI), polyisocyanate-based prepolymers, and mixtures thereof. Polymeric MDI contains varying amounts of isomeric diphenylmethane diisocyanates and three-ring, four-ring, and greater than four-ring oligomers. In general, any commercial polymeric MDI having an isocyanate content of about 25 wt % or more may be used. A preferred polymeric MDI has an isocyanate content of about 30 wt % or more. Other isocyanates may be present with the polymeric MDI in minor amounts, as long as the polyisocyanate mixture as whole remains liquid. Preferably, the polyisocyanate is a polymeric MDI.

Polyurethane foam compositions of this invention are formed from two components, an A side and a B side. The A side is one or more polyisocyanates as described above, and the B side comprises a formulation of this invention. The A side and B side components are typically contacted in a ratio of about 1:1 by volume. The polyurethane formation reaction generally occurs readily at room temperature; normally, the A side and the B side begin to react with each other as soon as they are in contact, and continue to react (cure), forming a polyurethane foam. Often, the mixture of the A side and B side is sprayed or cast to form a polyurethane foam.

The polyurethane foam compositions of this invention are formed from A side and B side components in which the A side is a polyisocyanate as described above and the B side comprises a formulation of the invention.

The amount of isocyanates and/or polyisocyanate may be defined in terms of the Isocyanate Index.

$$\text{Isocyanate Index} = \frac{\text{Actual equivalent amount of isocyanate used}}{\text{Theoretical equivalent amount of reactve hydrogens}} \times 100$$

The theoretical equivalent amount of isocyanate is equal to one equivalent of isocyanate per one equivalent of reactive hydrogens from the B side. Rigid polyurethane foams are usually formed by bringing together polyisocyanates with compounds having isocyanate-reactive hydrogen atoms (e.g., hydroxyl groups) in amounts such that the Isocyanate Index is in the range of about 85 to about 1000, preferably from about 95 to about 400, more preferably about 95 to about 200.

To form polyurethane foams, the functionality (i.e., average number of hydroxyl groups per molecule), of the formulation (B side) which is typically provided by the polyol or mixture of polyols, is usually about 2 or more, preferably about 2 to about 8; more preferably about 3 or more, especially about 3 to about 8, more especially about 3 to about 7. Monoalcohol reactive brominated flame retardants such as 2,3-dibromoallyl alcohol and tribromoneopentyl alcohol have a functionality of one (i.e., one hydroxyl group in the molecule), which is chain-terminating, so at least a portion of the polyols in the formulation have three or more hydroxyl groups per molecule to form polyurethane foams. The hydroxyl groups of the isocyanate-reactive brominated flame retardants are included in the calculation of the average functionality of the B side.

The polyurethane foams formed in this invention have a density range that varies with the end use application. For open-cell insulation foams, the density range is generally about 0.4 lb/ft$^3$ to about 1.2 lb/ft$^3$ (6.3 kg/m$^3$ to 18.9 kg/m$^3$). For closed-cell insulation foams, the density range is typically about 1.6 lb/ft$^3$ to about 3.5 lb/ft$^3$ (25.6 kg/m$^3$ to 56.1 kg/m$^3$). For molded architectural foams, the density range is usually about 4.0 lb/ft$^3$ to about 31 lb/ft (64.0 kg/m$^3$ to 497 kg/m$^3$).

The following examples are presented for purposes of illustration, and are not intended to impose limitations on the scope of this invention.

EXAMPLES—GENERAL

In the Examples, some of the substances used are referred to by their trade names. More specifically:
E-300: a mixture of 3,5-dimethylthio-toluene-2,4-diamine and 3,5-dimethylthio-toluene-2,6-diamine (Ethacure® 300 curative, Albemarle Corporation).
Saytex® RB-79: a mixed ester of tetrabromophthalic anhydride with diethylene glycol and propylene glycol (Saytex® RB-79 flame retardant, Albemarle Corporation).
DBAA: 2,3-dibromoallyl alcohol.
SHEDS: bis(2-hydroxyethyl)disulfide.
TCPP: tris(1-chloro-2-propyl)phosphate.
EB: 2-butoxyethanol.
Nanoclay: montmorillonite clay, surface modified to contain 0.5 to 5 wt % aminopropyltriethoxysilane (Nanomer® I.31PS, Sigma-Aldrich).
Voranol® 280: a polyether polyol with a functionality of about 7.0, a hydroxyl number of about 280, and an average molecular weight of about 1400 (Dow Chemical Company).
Terate® HT 5349: an aromatic polyester polyol with a functionality of about 2.45, and a hydroxyl number of 295-315 (Invista).
Stepanpol® PS-2412: a modified aromatic polyester polyol with a functionality of about 2.0, a hydroxyl number of about 240, and an average molecular weight of about 468 (Stepan Chemical Company).
Carpol® GP-1500: glycerin-initiated polyether polyol with a functionality of about 3, a hydroxyl number of 112, and an average molecular weight of about 1500; Carpol® GP-700: glycerine and propylene oxide polyether polyol with a functionality of 3, a hydroxyl number of 240, and an average molecular weight of about 700 (all Carpol® materials are products of Carpenter Company).
Dabco® DC193: silicone surfactant; Dabco® T-120: dibutylbis(dodecylthio) stannane;
Dabco K-15: potassium octoate; Dabco® TMR-2: 2-hydroxypropyltrimethylammonium formate; Dabco® T: amine with hydroxyl groups; Dabco PM-300: 2-butoxyethanol (all Dabco® materials are products of Air Products and Chemicals, Inc).
Polycat® 204: amine catalyst (Air Products and Chemicals, Inc).
Solstice® LBA: trans-1-chloro-3,3,3-trifluoropropene (Honeywell).
Genetron® 245fa: 1,1,1,3,3-pentafluoropropane (Honeywell).
Opteon™ 1100: 1,2-bis(trifluoromethyl)ethene; also called Formacel® 1100 (The Chemours Company).
Papi® 27: polymeric MDI (Dow Plastics).

To prepare each polyurethane foam, blends of the B-side other than the catalyst(s) (polyols, surfactants, reactive brominated flame retardant(s), reactive sulfur-containing compound, and blowing agent) were made. The polyisocyanate and the B-side formulation were weighed into a 16 oz. (473 mL) paper cup and then mixed at 2000 rpm with a bow tie agitator for 15 seconds, at which point the catalyst(s) were injected into the mixture while the agitation continued. At the 20-second mark, the agitation was discontinued. After allowing the foam to sit for at least 24 hours, it was cut to generate the specimens for cone calorimeter testing. The specimen dimension was 4 in.×4 in.×1 in. (10.2 cm×10.2 cm×2.54 cm). Each specimen was weighed to determine the foam density. The catalyst was added after the A side and B side were brought into contact, which is related to handling and timing on the laboratory scale; at larger scales, the catalyst(s) are included in the B side formulations.

Cone calorimetry measurements were performed on a Fire Testing Technology Dual Cone calorimeter according to ASTM E-1354. For Examples 1-2 and 4, an incident heat flux of 40 kW/m$^2$ was used in the cone calorimetry tests for the Predicted Smoke Index calculations and an incident heat flux of 100 kW/m$^2$ was used in the cone calorimetry tests for the Predicted Flame Spread Index calculations. In Example 3, an incident heat flux of 50 kW/m$^2$ was used in the cone calorimetry tests for both the Predicted Smoke Index calculations and the Predicted Flame Spread Index calculations. The Peak Heat Release Rate (PHRR), the maximum value of the heat released during combustion of the sample in the cone calorimeter, was measured. The ASTM E-84 burn profiles for Predicted Smoke Index calculations and for predicted Flame Spread Index calculations were calculated from the cone calorimetry results. Using mathematical equations that were previously derived from a cone calorimeter and ASTM E-84 correlation study, the cone calorimeter results were converted into predicted numbers as in ASTM E-84. The target value for the Flame Spread Index was less than 25, and the target value for the Smoke Index was less than 450. The term "Smoke Index" is short for "smoke density developed", which is also referred to as "Smoke Developed Index" and "Smoke Density Index."

For some samples, the dimensional stability was determined. Some samples were subjected to a thermal conductivity test, and R values were calculated from the thermal conductivities. The R value (or R-value) is a measure of insulation efficiency or thermal resistance (the ability of a material to slow down heat transfer within itself), and is often used in the building and construction industry. The higher the R-value, the more a material prevents heat transfer.

Example 1—Comparative

In the runs of this Example, the reactive sulfur-containing compound, the reactive brominated flame retardant, or both, were omitted from the foam. Amounts of the components are listed in Table 1, in which all amounts are reported as wt %; results are summarized in Table 2.

In regard to Run e, the RB-79 and TCPP were added as Saytex® RB-7001 flame retardant, a preformed mixture. Saytex® RB-7001 flame retardant is a blend of a mixed ester of tetrabromophthalic anhydride with diethylene glycol and propylene glycol and tris(2-chloropropyl)phosphate in a 45:55 ratio (Albemarle Corporation).

TABLE 1

| Example 1 - Run | a | b | c | d | e | f | g | h |
| --- | --- | --- | --- | --- | --- | --- | --- | --- |
| B side | | | | | | | | |
| Viscosity (cPs; at 25° C.) | 1520 | 1455 | — | — | 1220 | 1090 | 890 | 1270 |
| E-300 | — | 4.59 | 11.97 | — | — | — | — | — |
| TCPP | — | — | — | 11.97 | 6.58 | — | — | 7.96 |
| RB-79 | — | — | — | — | 5.39 | — | — | — |
| DBAA | — | — | — | — | — | 7.38 | 11.97 | 4.01 |
| Terate ® HT 5349 | 54.85 | 51.80 | 46.91 | 46.91 | 46.91 | 49.95 | 46.91 | 48.21 |
| Voranol ® 280 | 27.85 | 26.31 | 23.82 | 23.82 | 23.82 | 25.37 | 23.82 | 24.49 |
| Dabco ® DC193 | 2.00 | 2.00 | 2.00 | 2.00 | 2.00 | 2.00 | 2.00 | 2.00 |
| Dabco ® T-120 | 0.25 | 0.25 | 0.25 | 0.25 | 0.25 | 0.25 | 0.25 | 0.25 |
| Dabco ® K-15 | 0.25 | 0.25 | 0.25 | 0.25 | 0.25 | 0.25 | 0.25 | 0.25 |
| Polycat 204 | 4.00 | 4.00 | 4.00 | 4.00 | 4.00 | 4.00 | 4.00 | 4.00 |
| Water | 0.80 | 0.80 | 0.80 | 0.80 | 0.80 | 0.80 | 0.80 | 0.80 |
| Solstice ® LBA | 10.00 | 10.00 | 10.00 | 10.00 | 10.00 | 10.00 | 10.00 | 10.00 |
| A side | | | | | | | | |
| Papi ® 27 | 100 | 100 | 100 | 100 | 100 | 100 | 100 | 100 |

TABLE 2

| | Example 1 - Foam properties | | | | | |
| --- | --- | --- | --- | --- | --- | --- |
| Run | a | b | e | f | g | h |
| E-300 | — | 2.22 wt % | — | — | — | — |
| TCPP | — | — | 3.29 wt % | — | — | 6.65 wt % |
| RB-79 | — | — | 2.70 wt % | — | — | — |
| DBAA | — | — | — | 3.64 wt % | 5.97 wt % | 3.35 wt % |
| Density | 2.11 lb/ft$^3$ (33.8 kg/m$^3$) | 2.18 lb/ft$^3$ (34.9 kg/m$^3$) | 2.08 lb/ft$^3$ (33.3 kg/m$^3$) | 1.87 lb/ft$^3$ (30.0 kg/m$^3$) | 1.77 lb/ft$^3$ (28.4 kg/m$^3$) | 1.95 lb/ft$^3$ (31.2 kg/m$^3$) |
| Peak Heat Release Rate | 255 | 264 | 213 | 229 | 205 | 201 |
| R-value | 7.84/inch 1.356 m$^2$K/W | 7.46/inch 1.290 m$^2$K/W | 7.29/inch 1.261 m$^2$K/W | 7.38/inch 1.276 m$^2$K/W | 7.89/inch 1.364 m$^2$K/W | 7.61/inch 1.316 m$^2$K/W |
| Predicted Flame Spread Index | 23 | 20.8 | 19 | 21.1 | 19.5 | 19.2 |
| Predicted Smoke Index | 81 | 134 | 23 | 16 | 24 | 25 |

Example 2

In the runs of this Example, a sulfur-containing aromatic diamine and a reactive brominated flame retardant were included in the foam. The sulfur-containing aromatic diamine and the reactive brominated flame retardant were combined, and the properties of these mixture were tested; results are summarized in Table 3. In the runs of this Example, the foams were made with equivalent (equimolar) bromine content. Amounts of the components used in making the foam are listed in Table 4; results on the foams are summarized in Table 5.

TABLE 3

| Example 2-Run | 1 | 2 | 3 | 4 |
|---|---|---|---|---|
| E-300 | 27.69 wt % | 22.15 wt % | 38.36 wt % | 32.85 wt % |
| RB-79 | 72.31 wt % | 57.85 wt % | — | — |
| DBAA | — | — | 61.6 wt % | 52.76 wt % |
| EB | — | 20.00% | — | 14.39 wt % |
| Viscosity (25° C.) | 31,650 cPs | 450 cPs | 60 cPs | 50 cPs |
| Bromine content | 32.9 wt % | 26.3 wt % | 45.6 wt % | 39.0 wt % |
| Sulfur content | 8.3 wt % | 6.6 wt % | 8.4 wt % | 9.8 wt % |
| Specific Gravity | 1.585 | 1.389 | 1.696 | 1.516 |
| OH number, mg KOH/g | 302.4 | 336.9 | 361.3 | 377.7 |

TABLE 4

| Example 2-Run | 1 | 2 | 3 | 4 |
|---|---|---|---|---|
| B side | | | | |
| Viscosity (25° C.) | 2106 cPs | 1265 cPs | 960 cPs | 805 cPs |
| E-300 | 4.60 wt % | 4.60 wt % | 4.59 wt % | 4.59 wt % |
| RB-79 | 12.00 wt % | 12.00 wt % | — | — |
| DBAA | — | — | 7.37 wt % | 7.37 wt % |
| EB | — | 4.15 wt % | — | 2.00 wt % |
| Terate ® HT 5349 | 43.84 wt % | 41.09 wt % | 46.91 wt % | 45.58 wt % |
| Voranol ® 280 | 22.26 wt % | 20.87 wt % | 23.82 wt % | 23.15 wt % |
| Dabco ® DC193 | 2.00 wt % | 2.00 wt % | 2.00 wt % | 2.00 wt % |
| Dabco ® T-120 | 0.25 wt % | 0.25 wt % | 0.25 wt % | 0.25 wt % |
| Dabco ® K-15 | 0.25 wt % | 0.25 wt % | 0.25 wt % | 0.25 wt % |
| Polycat 204 | 4.00 wt % | 4.00 wt % | 4.00 wt % | 4.00 wt % |
| Water | 0.80 wt % | 0.80 wt % | 0.80 wt % | 0.80 wt % |
| Solstice ® LBA | 10.00 wt % | 10.00 wt % | 10.00 wt % | 10.00 wt % |
| A side | | | | |
| Papi ® 27 | 100 wt % | 100 wt % | 100 wt % | 100 wt % |

TABLE 5

| | Foam properties | | | |
|---|---|---|---|---|
| Example 2-Run | 1 | 2 | 3 | 4 |
| E-300 | 2.3 wt % | 2.3 wt % | 2.30 wt % | 2.30 wt % |
| RB-79 | 6.00 wt % | 6.00 wt % | — | — |
| DBAA | — | — | 3.68 wt % | 3.68 wt % |
| EB | 0 wt % | 2.08 wt % | — | 1.0 wt % |
| Density | 2.02 lb/ft³ (32.4 kg/m³) | 2.05 lb/ft³ (32.8 kg/m³) | 1.92 lb/ft³ (30.8 kg/m³) | 1.86 lb/ft³ (29.8 kg/m³) |
| Peak Heat Release Rate | 233 | 237 | 200 | 214 |
| R-value | 7.88/inch 1.363 m²K/W | 7.56/inch 1.307 m²K/W | 7.55/inch 1.306 m²K/W | 7.68/inch 1.328 m²K/W |
| Predicted Flame Spread Index | 19.5 | 19.4 | 16 | 20.7 |
| Predicted Smoke Index | 14 | 23 | 27 | 13 |

Example 3

In the runs of this Example, a sulfur-containing aromatic diamine and a reactive brominated flame retardant were included in the foam. One of the runs in this Example employed a nanoclay. RB-79 and TCPP were added as Saytex® RB-7001 flame retardant; additional TCPP was added to the B-side mixture.

In the two runs of this Example, the foams were made with equivalent (equimolar) bromine content. Amounts of the components used in making the foam are listed in Table 6. Some of the curing properties of the foams were measured; results are summarized in Table 7; results on the foams are also summarized in Table 7.

Figure 1A:
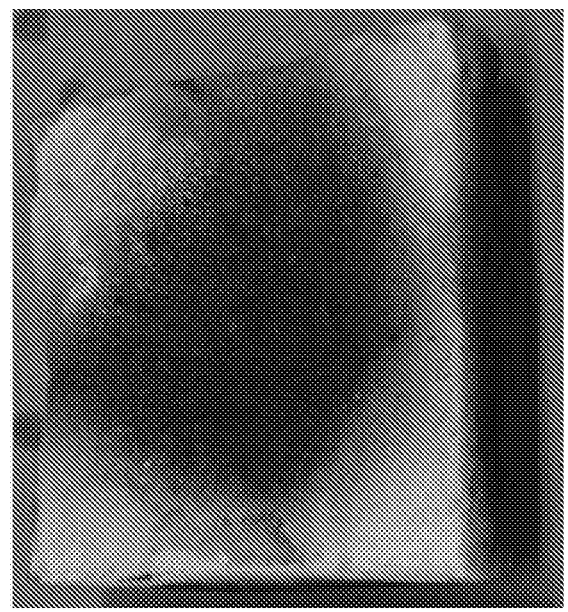
FIG. 1A is a photograph showing the char on the underside of a rigid polyurethane foam square formed from ingredients including E-300 and RB-79.
Figure 2:
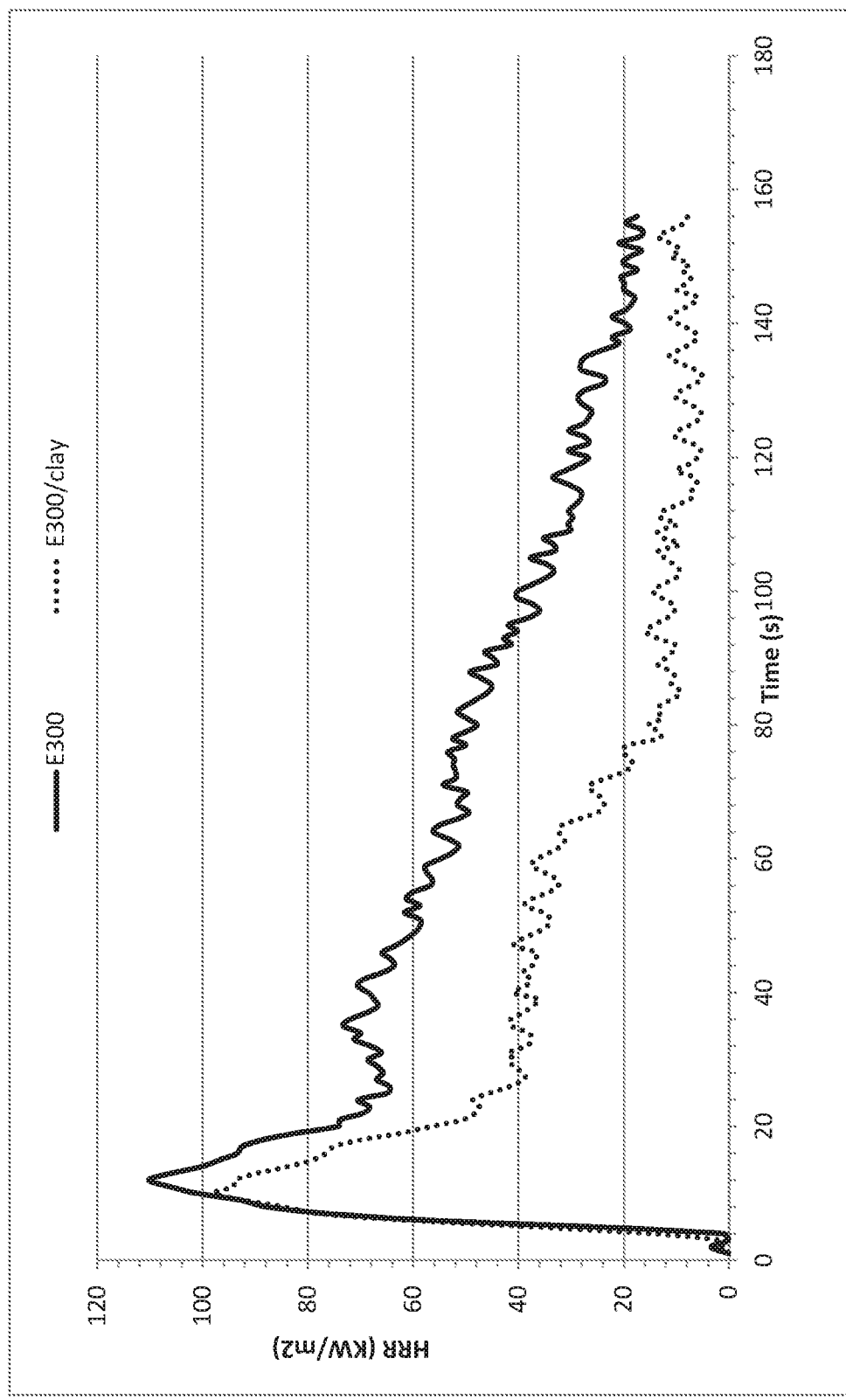
FIG. 2 shows cone calorimeter heat release rate curves for Example 3, Run i (solid line), and Example 3, Run ii (dashed line).

FIG. 1A is a photograph showing the char on the underside of rigid polyurethane foam square formed as in Run i, in which the ingredients included E-300 and RB-79. FIG. 1B is a photograph showing the char on the underside of rigid polyurethane foam square formed as in Run ii, in which the ingredients included E-300, RB-79, and a nanoclay. FIG. 2 shows cone calorimeter heat release rate curves for Example 3, Run i (solid line), and Example 3, Run ii (dashed line). With the addition of 0.7 wt % nanoclay to the formulation, the flame retardant performance of the foam was improved.

TABLE 6

| Example 4-Run | i | ii |
|---|---|---|
| B side | | |
| E-300 | 1.54 wt % | 1.54 wt % |
| RB-79 | 6.46 wt % | 6.46 wt % |
| TCPP | 30.18 wt % | 29.52 wt % |
| Nanoclay | 0 wt % | 0.66 wt % |
| Stepanpol ® PS-2412 | 2.07 wt % | 2.07 wt % |
| Dabco ® DC193 | 0.88 wt % | 0.88 wt % |
| Dabco ® TMR-2 | 0.86 wt % | 0.86 wt % |
| Dabco ® K-15 | 1.29 wt % | 1.29 wt % |
| Dabco ® T | 0.44 wt % | 0.44 wt % |
| Dabco ® PM-300 | 0.44 wt % | 0.44 wt % |
| Water | 0.44 wt % | 0.44 wt % |
| Genetron ® 245fa | 7.84 wt % | 7.84 wt % |
| A side | | |
| Papi ® 27 | 47.55 wt % | 47.55 wt % |

TABLE 7

| Example 4-Formulation | Run i | Run ii (+clay) |
|---|---|---|
| Cream time | 9 sec | 8.72 sec |
| Gel time | 43 sec | 45 sec |
| Rise time | 1 min. 5 s | 1 min. 20 s |
| Tack free time | 2 min. 17 s | 3 min. 16 s |
| Density | 1.89 lb/ft³ (30.3 kg/m³) | 2.01 lb/ft³ (32.2 kg/m³) |
| LOI[1] | 31.7 | 31.9 |
| R value | 5.5/inch 0.951 m²K/W | 5.4/inch 0.934 m²K/W |
| Dimensional stability[2] (vol. change) | −6.62% | −4.42% |
| Compressive Strength | 11.2 psi (7.72 × 10⁴ Pa) | 9.8 psi (6.76 × 10⁴ Pa) |

[1]Limiting Oxygen Index.
[2]Dimensional stability was measured at 70° C. for 14 days at 95% RH.

Example 4

In the runs of this Example, a disulfide and a reactive brominated flame retardant were included in the foam. In the runs of this Example, the foams were made with equivalent (equimolar) bromine content. Amounts of the components used in making the foam are listed in Table 8, in which all amounts are reported as wt %; results on the foams are summarized in Table A below.

Some of the runs employing BHEDS as the sulfur-containing compound have not been optimized with regard to the balance of polyol and/or polyether present in the formulation. Table C shows that most of the B-side formulations containing BHEDS had relatively low viscosities (under 1000 cPs).

TABLE 8

| Example 4 - Run | A | B | C | D | E | F |
|---|---|---|---|---|---|---|
| B side | | | | | | |
| Viscosity (25° C.) | 930 cPs | 1275 cPs | 325 cPs | 640 cPs | 625 cPs | 570 cPs |
| BHEDS | 2.01 | 2.00 | 2.00 | 2.00 | 2.00 | 2.00 |
| DBAA | 8.02 | 8.00 | 8.00 | 8.00 | 8.00 | 8.00 |
| Terate ® HT 5349 | 46.34 | 53.34 | — | 33.34 | 46.2 | 47.72 |
| Voranol ® 280 | 24.47 | — | — | — | — | — |
| Carpol ® GP-700 | — | 28.16 | 81.35 | — | 24.4 | 25.20 |
| Carpol ® GP-1500 | — | — | — | 48.01 | — | — |
| Dabco ® DC193 | 2.01 | 2.00 | 2.00 | 2.00 | 2.00 | 2.00 |
| Dabco ® T-120 | 0.25 | 0.25 | 0.25 | 0.25 | 0.25 | 0.25 |
| Dabco ® K-15 | 0.25 | 0.25 | 0.25 | 0.25 | 0.25 | 0.25 |
| Polycat 204 | 4.01 | 4.00 | 4.00 | 4.00 | 4.00 | 4.00 |
| Water | 0.60 | 2.00 | 2.15 | 2.15 | 0.65 | 0.58 |
| Opteon ™ 1100 | 10.00 | — | — | 12.00 | — | — |
| A side | | | | | | |
| Papi ® 27 | 100 | 100 | 100 | 100 | 100 | 100 |
| Isocyanate Index | 1.107 | 0.899 | 1.051 | 1.087 | 1.153 | 1.157 |

Example 5

In the runs of this Example, various combinations of disulfide, a sulfur-containing aromatic diamine, and reactive brominated flame retardant(s) were included in the inventive foams. Runs 1-10 are comparative. In the runs of this Example, the foams were made with equivalent (equimolar) bromine content. Amounts of the components used in making the foam are listed below in Tables B-1 to B-4; results on the foams are summarized in Tables C-1 to C-5 below.

TABLE A

| | Example 4 - Foam properties | | | | | |
|---|---|---|---|---|---|---|
| Run | A | B | C | D | E | F |
| BHEDS | 1.00 wt % | 1.00 wt % | 1.00 wt % | 1.00 wt % | 1.00 wt % | 1.00 wt % |
| DBAA | 4.01 wt % | 4.00 wt % | 4.00 wt % | 4.00 wt % | 4.00 wt % | 4.00 wt % |
| Density | 1.99 lb/ft$^3$ (31.9 kg/m$^3$) | 2.12 lb/ft$^3$ (34.0 kg/m$^3$) | 2.08 lb/ft$^3$ (33.3 kg/m$^3$) | 2.48 lb/ft$^3$ (39.7 kg/m$^3$) | 2.03 lb/ft$^3$ (32.5 kg/m$^3$) | 2.01 lb/ft$^3$ (32.2 kg/m$^3$) |
| Dimensional Stability* (vol. change) | 3.99% | −72.6% | −48.85% | 1.31% | 14.64% | 1.49% |
| Peak Heat Release Rate | 229 | 251 | 292 | 696 | 246 | 224 |
| R-value | 7.67/inch 1.326 m$^2$K/W | 6.55/inch 1.133 m$^2$K/W | 4.92/inch 0.851 m$^2$K/W | 4.24/inch 0.733 m$^2$K/W | 7.57/inch 1.309 m$^2$K/W | 6.69/inch 1.157 m$^2$K/W |
| Predicted Flame Spread Index | 19.8 | 22.4 | 23.3 | 23.3 | 21.5 | 20.3 |
| Predicted Smoke Index | 20 | 13 | 326 | 1509 | 19 | 34 |

*Dimensional stability was measured at 70° C. for 14 days at 95% RH.

TABLE B-1

| Example 5 - Run | 1 | 2 | 3 | 4 | 5 | 6 | 7 | 8 | 9 | 10 |
|---|---|---|---|---|---|---|---|---|---|---|
| B side | | | | | | | | | | |
| Viscosity (25° C.) | 1180 cPs | 1405 cPs | 1810 cPs | 580 cPs | 700 cPs | 1880 cPs | 1910 cPs | 1150 cPs | 1170 cPs | 1560 cPs |
| E-300 | 19.03 | — | — | — | — | — | — | — | — | 11.69 |
| BHEDS | — | 19.56 | 19.29 | — | — | — | — | — | — | — |
| RB-79 | — | — | — | — | — | 17.72 | 16.83 | — | — | 11.18 |
| DBAA | — | — | — | 19.63 | 18.20 | — | — | — | — | — |
| Br$_3$neopentylOH | — | — | — | — | — | — | — | 19.11 | 17.55 | — |
| Terate ® HT 5349 | 40.22 | 44.57 | 49.39 | 38.69 | 44.27 | 40.58 | 44.91 | 39.22 | 44.91 | 39.28 |
| Voranol ® 280 | 21.80 | 25.08 | 20.53 | 22.82 | 18.67 | 22.81 | 19.37 | 22.82 | 18.68 | 18.92 |
| Dabco ® DC193 | 1.96 | 2.16 | 2.16 | 1.96 | 1.96 | 1.96 | 1.96 | 1.96 | 1.96 | 1.96 |
| Dabco ® T-120 | 0.24 | 0.27 | 0.27 | 0.25 | 0.25 | 0.25 | 0.25 | 0.25 | 0.25 | 0.25 |
| Dabco ® K-15 | 0.24 | 0.27 | 0.27 | 0.25 | 0.25 | 0.25 | 0.25 | 0.25 | 0.25 | 0.25 |
| Polycat 204 | 3.92 | 4.31 | 4.31 | 3.93 | 3.93 | 3.92 | 3.92 | 3.93 | 3.93 | 3.92 |
| Water | 0.83 | — | — | 0.69 | 0.69 | 0.74 | 0.74 | 0.68 | 0.69 | 0.78 |
| Opteon ™ 1100 | 11.76 | 3.78 | 3.78 | 11.78 | 11.78 | 11.77 | 11.77 | 11.78 | 11.78 | 11.77 |
| A side | | | | | | | | | | |
| Papi ® 27 | 100 | 100 | 100 | 100 | 100 | 100 | 100 | 100 | 100 | 100 |

TABLE B-2

| Example 5 - Run | 11 | 12 | 13 | 14 | 15 | 16 | 17 |
|---|---|---|---|---|---|---|---|
| B side | | | | | | | |
| Viscosity (25° C.) | 710 cPs | 1155 cPs | 1100 cPs | 1170 cPs | 1185 cPs | 1150 cPs | 2010 cPs |
| E-300 | 11.73 | 14.52 | 4.15 | 9.01 | 19.61 | 9.01 | — |
| BHEDS | — | — | — | — | — | — | 4.17 |
| RB-79 | — | — | — | — | — | — | 19.69 |
| DBAA | 11.32 | 3.01 | — | — | — | — | — |
| Br$_3$neopentylOH | — | — | 19.63 | 9.26 | 4.15 | 9.26 | — |
| Terate ® HT 5349 | 38.69 | 44.89 | 38.73 | 42.04 | 38.66 | 42.04 | 38.83 |
| Voranol ® 280 | 19.37 | 18.66 | 18.68 | 20.80 | 18.66 | 20.80 | 18.74 |
| Dabco ® DC193 | 1.96 | 1.96 | 1.96 | 1.96 | 1.96 | 1.96 | 1.97 |
| Dabco ® T-120 | 0.25 | 0.25 | 0.25 | 0.25 | 0.25 | 0.25 | 0.25 |
| Dabco ® K-15 | 0.25 | 0.25 | 0.25 | 0.25 | 0.25 | 0.25 | 0.25 |
| Polycat 204 | 3.92 | 3.92 | 3.93 | 3.92 | 3.92 | 3.92 | 3.94 |
| Water | 0.74 | 0.78 | 0.64 | 0.74 | 0.78 | 0.74 | 0.34 |
| Opteon ™ 1100 | 11.77 | 11.76 | 11.78 | 11.77 | 11.76 | 11.77 | 11.82 |
| A side | | | | | | | |
| Papi ® 27 | 100 | 100 | 100 | 100 | 100 | 100 | 100 |

| Example 5 - Run | 18 | 19 | 20 | 21 | 22 |
|---|---|---|---|---|---|
| B side | | | | | |
| Viscosity (25° C.) | 1500 cPs | 1175 cPs | 1200 cPs | 800 cPs | 880 cPs |
| E-300 | — | — | — | — | — |
| BHEDS | 11.61 | 11.82 | 11.82 | 8.37 | 8.37 |
| RB-79 | 10.23 | — | — | — | — |
| DBAA | — | — | — | 9.59 | 9.59 |
| Br$_3$neopentylOH | — | 11.68 | 11.68 | — | — |
| Terate ® HT 5349 | 39.98 | 40.30 | 40.30 | 42.53 | 42.51 |
| Voranol ® 280 | 21.98 | 20.68 | 20.68 | 21.22 | 21.20 |
| Dabco ® DC193 | 2.03 | 2.04 | 2.04 | 1.98 | 1.98 |
| Dabco ® T-120 | 0.25 | 0.25 | 0.25 | 0.25 | 0.25 |
| Dabco ® K-15 | 0.25 | 0.25 | 0.25 | 0.25 | 0.25 |

TABLE B-2-continued

|  | | | | | |
|---|---|---|---|---|---|
| Polycat 204 | 4.05 | 4.09 | 4.09 | 3.95 | 3.95 |
| Water | — | — | — | — | 0.05 |
| Opteon ™ 1100 | 9.62 | 8.89 | 8.89 | 11.86 | 11.85 |
| A side | | | | | |
| Papi ® 27 | 100 | 100 | 100 | 100 | 100 |

TABLE B-3

| Example 5 - Run | 23 | 24 | 25 | 26 | 27 | 28 | 29 | 30 |
|---|---|---|---|---|---|---|---|---|
| B side | | | | | | | | |
| Viscosity (25° C.) | 1270 cPs | 1330 cPs | 1250 cPs | 1380 cPs | 685 cPs | 1535 cPs | 715 cPs | 1285 cPs |
| E-300 | — | — | — | — | — | 1.94 | 0.47 | — |
| BHEDS | 6.87 | 6.90 | 4.17 | 22.17 | 5.34 | — | — | 4.15 |
| RB-79 | 8.52 | 8.55 | 5.61 | 1.08 | — | 11.40 | — | 11.67 |
| DBAA | — | — | — | 3.61 | 17.42 | — | 9.50 | 3.31 |
| Br₃neopentylOH | 5.72 | 5.75 | 14.10 | — | 1.12 | 8.22 | 10.13 | 0.54 |
| Terate ® HT 5349 | 41.73 | 41.88 | 38.84 | 43.72 | 38.87 | 38.71 | 41.20 | 38.83 |
| Voranol ® 280 | 18.78 | 18.86 | 18.75 | 21.10 | 18.76 | 20.87 | 19.84 | 22.89 |
| Dabco ® DC193 | 1.97 | 2.00 | 1.97 | 2.22 | 1.97 | 1.96 | 1.96 | 1.97 |
| Dabco ® T-120 | 0.25 | 0.25 | 0.25 | 0.28 | 0.25 | 0.25 | 0.25 | 0.25 |
| Dabco ® K-15 | 0.25 | 0.25 | 0.25 | 0.28 | 0.25 | 0.25 | 0.25 | 0.25 |
| Polycat 204 | 3.95 | 3.96 | 3.94 | 4.43 | 3.94 | 3.93 | 3.93 | 3.94 |
| Water | 0.12 | 0.20 | 0.30 | — | 0.25 | 0.69 | 0.69 | 0.39 |
| Opteon ™ 1100 | 11.84 | 11.40 | 11.82 | 1.11 | 11.83 | 11.78 | 11.78 | 11.81 |
| A side | | | | | | | | |
| Papi ® 27 | 100 | 100 | 100 | 100 | 100 | 100 | 100 | 100 |

TABLE B-4

| Example 5 - Run | 31 | 32 | 33 | 34 | 35 | 36 | 37 | 38 |
|---|---|---|---|---|---|---|---|---|
| B side | | | | | | | | |
| Viscosity (25° C.) | 1120 cPs | 1055 cPs | 1430 cPs | 1025 cPs | 940 cPs | 1105 cPs | 990 cPs | 1250 cPs |
| E-300 | 9.88 | 9.79 | 6.48 | 7.97 | 8.89 | 0.19 | 4.20 | 2.97 |
| BHEDS | 10.20 | 10.11 | 5.42 | 0.03 | 3.35 | 0.84 | 2.28 | 1.67 |
| RB-79 | 0.94 | 0.94 | 7.57 | 6.71 | — | 10.17 | 5.09 | 3.32 |
| DBAA | — | — | — | 6.80 | 3.95 | 9.46 | 4.83 | 3.30 |
| Br₃neopentylOH | — | — | — | — | 3.47 | — | 7.31 | 2.15 |
| Terate ® HT 5349 | 41.92 | 41.54 | 43.03 | 39.86 | 38.82 | 40.93 | 38.78 | 44.95 |
| Voranol ® 280 | 20.09 | 19.91 | 18.97 | 19.74 | 22.87 | 19.60 | 18.82 | 22.83 |
| Dabco ® DC193 | 2.01 | 1.99 | 1.97 | 1.96 | 1.97 | 1.96 | 1.97 | 1.96 |
| Dabco ® T-120 | 0.25 | 0.25 | 0.25 | 0.25 | 0.25 | 0.25 | 0.25 | 0.25 |
| Dabco ® K-15 | 0.25 | 0.25 | 0.25 | 0.25 | 0.25 | 0.25 | 0.25 | 0.25 |
| Polycat 204 | 4.02 | 3.98 | 3.94 | 3.92 | 3.93 | 3.93 | 3.93 | 3.93 |
| Water | 0.10 | — | 0.30 | 0.74 | 0.45 | 0.64 | 0.49 | 0.64 |
| Opteon ™ 1100 | 10.34 | 11.24 | 11.82 | 11.77 | 11.80 | 11.78 | 11.80 | 11.78 |
| A side | | | | | | | | |
| Papi ® 27 | 100 | 100 | 100 | 100 | 100 | 100 | 100 | 100 |

TABLE C-1

| Ex. 5 - Run | 1 | 2 | 3 | 4 | 5 | 6 | 7 |
|---|---|---|---|---|---|---|---|
| E-300 | 19.03 wt % | — | — | — | — | — | — |
| BHEDS | — | 19.56 wt % | 19.29 wt % | — | — | — | — |
| RB-79 | — | — | — | — | — | 17.72 wt % | 16.83 wt % |

TABLE C-1-continued

| Ex. 5 - Run | 1 | 2 | 3 | 4 | 5 | 6 | 7 |
|---|---|---|---|---|---|---|---|
| DBAA | — | — | — | 19.63 wt % | 18.20 wt % | — | — |
| Br₃neopentylOH | — | — | — | — | — | — | — |
| Density | 2.15 lb/ft³ (34.4 kg/m³) | 2.08 lb/ft³ (33.3 kg/m³) | 3.66 lb/ft³ (58.6 kg/m³) | 2.06 lb/ft³ (33.0 kg/m³) | 1.93 lb/ft³ (30.9 kg/m³) | 2.23 lb/ft³ (35.7 kg/m³) | 2.27 lb/ft³ (36.4 kg/m³) |
| Compressive Strength | 30.6 psi (2.11 × 10⁵ Pa) | 15.1 psi (1.04 × 10⁵ Pa) | 55.1 psi (3.80 × 10⁵ Pa) | 15.9 psi (1.10 × 10⁵ Pa) | 15.0 psi (1.03 × 10⁵ Pa) | 25.4 psi (1.75 × 10⁵ Pa) | 22.3 psi (1.54 × 10⁵ Pa) |
| Dimensional Stability* (vol. change) | 0.00 | −52.58 | −8.20 | −9.88 | −11.44 | 0.73 | 2.78 |
| Peak Heat Release Rate | 257 | 290 | 283 | 196 | 181 | 231 | 201 |
| R-value | 7.34/inch 1.269 m²K/W | 7.12/inch 1.231 m²K/W | 7.07/inch 1.223 m²K/W | 7.99/inch 1.382 m²K/W | 7.65/inch 1.323 m²K/W | 8.10/inch 1.401 m²K/W | 8.13/inch 1.406 m²K/W |
| Predicted Flame Spread Index | 21.7 | 22.1 | 17.3 | 16.2 | 16.7 | 19.8 | 18.6 |
| Predicted Smoke Index | 32 | 318 | 275 | 39 | 48 | 38 | 28 |

*Dimensional stability was measured at 70° C. for 14 days at 95% RH.

TABLE C-2

| Ex. 5 - Run | 8 | 9 | 10 | 13 | 14 | 15 | 16 |
|---|---|---|---|---|---|---|---|
| E-300 | — | — | 11.69 wt % | 4.15 wt % | 9.01 wt % | 19.61 wt % | 9.01 wt % |
| BHEDS | — | — | — | — | — | — | — |
| RB-79 | — | — | 11.18 wt % | — | — | — | — |
| DBAA | — | — | — | — | — | — | — |
| Br₃neopentylOH | 19.11 wt % | 17.55 wt % | — | 19.63 wt % | 9.26 wt % | 4.15 wt % | 9.26 wt % |
| Density | 2.14 lb/ft³ (34.3 kg/m³) | 2.17 lb/ft³ (34.8 kg/m³) | 2.11 lb/ft³ (33.8 kg/m³) | 2.05 lb/ft³ (32.8 kg/m³) | 2.17 lb/ft³ (33.8 kg/m³) | 2.16 lb/ft³ (34.6 kg/m³) | 2.20 lb/ft³ (35.2 kg/m³) |
| Compressive Strength | 18.7 psi (1.29 × 10⁵ Pa) | 21.0 psi (1.45 × 10⁵ Pa) | 29.2 psi (2.01 × 10⁵ Pa) | 22.7 psi (1.57 × 10⁵ Pa) | 26.5 psi (1.83 × 10⁵ Pa) | 27.8 psi (1.57 × 10⁵ Pa) | 28.2 psi (1.92 × 10⁵ Pa) |
| Dimensional Stability* (vol. change) | −0.35 | 0.56 | 0.56 | −1.93 | −3.16 | 3.36 | 0.93 |
| Peak Heat Release Rate | 180 | 189 | 204 | 187 | 213 | 225 | 205 |
| R-value | 7.74/inch 1.338 m²K/W | 8.05/inch 1.392 m²K/W | 7.62/inch 1.318 m²K/W | 8.22/inch 1.421 m²K/W | 7.89/inch 1.364 m²K/W | 7.72/inch 1.335 m²K/W | 7.56/inch 1.307 m²K/W |
| Predicted Flame Spread Index | 19.6 | 15.9 | 18.7 | 15.1 | 19.1 | 20.2 | 19.7 |
| Predicted Smoke Index | 67 | 50 | 19 | 37 | 25 | 23 | 26 |

*Dimensional stability was measured at 70° C. for 14 days at 95% RH.

TABLE C-3

| Example 5 - Run | 11 | 12 | 17 | 18 |
|---|---|---|---|---|
| E-300 | 11.73 wt % | 14.52 wt % | — | — |
| BHEDS | — | — | 4.17 wt % | 11.61 wt % |
| RB-79 | — | — | 19.69 wt % | 10.23 wt % |
| DBAA | 11.32 wt % | 3.01 wt % | — | — |
| Br₃neopentylOH | — | — | — | — |
| Density | 2.07 lb/ft³ (33.1 kg/m³) | 2.15 lb/ft³ (34.4 kg/m³) | 2.63 lb/ft³ (42.1 kg/m³) | 2.9163 lb/ft³ (46.6 kg/m³) |
| Compressive Strength | 26.1 psi (1.80 × 10⁵ Pa) | 26.1 psi (1.80 × 10⁵ Pa) | 29.6 psi (2.04 × 10⁵ Pa) | 37.4 psi (2.58 × 10⁵ Pa) |
| Dimensional Stability* (vol. change) | 2.97 | 0.80 | 0.12 | −0.62 |
| Peak Heat Release Rate | 229 | 247 | 212 | 223 |
| R-value | 7.66/inch 1.325 m²K/W | 7.33/inch 1.268 m²K/W | 7.86/inch 1.359 m²K/W | 8.05/inch 1.392 m²K/W |
| Predicted Flame Spread Index | 18.7 | 24.3 | 18.0 | 16.6 |
| Predicted Smoke Index | 29 | 25 | 24 | 12 |

TABLE C-3-continued

| Example 5 - Run | 19 | 20 | 21 | 22 |
|---|---|---|---|---|
| E-300 | — | — | — | — |
| BHEDS | 11.82 wt % | 11.82 wt % | 8.37 wt % | 8.37 wt % |
| RB-79 | — | — | — | — |
| DBAA | — | — | 9.59 wt % | 9.59 wt % |
| Br$_3$neopentylOH | 11.68 wt % | 11.68 wt % | — | — |
| Density | 3.0863 lb/ft$^3$ (49.3 kg/m$^3$) | 3.2663 lb/ft$^3$ (52.2 kg/m$^3$) | 2.1163 lb/ft$^3$ (33.8 kg/m$^3$) | 2.6063 lb/ft$^3$ (41.6 kg/m$^3$) |
| Compressive Strength | 41.3 psi (2.85 × 10$^5$ Pa) | 38.9 psi (2.68 × 10$^5$ Pa) | 21.0 psi (1.45 × 10$^5$ Pa) | 30.6 psi (2.11 × 10$^5$ Pa) |
| Dimensional Stability* (vol. change) | −0.19 | 1.16 | 0.66 | 0.04 |
| Peak Heat Release Rate | 193 | 178 | 189 | 179 |
| R-value | 7.83/inch 1.354 m$^2$K/W | 8.10/inch 1.401 m$^2$K/W | 8.17/inch 1.413 m$^2$K/W | 8.50/inch 1.470 m$^2$K/W |
| Predicted Flame Spread Index | 16.2 | 15.1 | 18.0 | 14.0 |
| Predicted Smoke Index | 19 | 8 | 26 | 28 |

*Dimensional stability was measured at 70° C. for 14 days at 95% RH.

TABLE C-4

| Example 5 - Run | 23 | 24 | 25 | 26 |
|---|---|---|---|---|
| E-300 | — | — | — | — |
| BHEDS | 6.87 wt % | 6.90 wt % | 4.17 wt % | 22.17 wt % |
| RB-79 | 8.52 wt % | 8.55 wt % | 5.61 wt % | 1.08 wt % |
| DBAA | — | — | — | 3.61 wt % |
| Br$_3$neopentylOH | 5.72 wt % | 5.75 wt % | 14.10 wt % | — |
| Density | 2.2463 lb/ft$^3$ (35.9 kg/m$^3$) | 2.2063 lb/ft$^3$ (35.2 kg/m$^3$) | 2.32 lb/ft$^3$ (37.1 kg/m$^3$) | 3.72 lb/ft$^3$ (59.6 kg/m$^3$) |
| Compressive Strength | 26.9 psi (1.85 × 10$^5$ Pa) | 23.5 psi (1.62 × 10$^5$ Pa) | 27.7 psi (1.91 × 10$^5$ Pa) | 23.3 psi (1.61 × 10$^5$ Pa) |
| Dimensional Stability* (vol. change) | 4.41 | 1.04 | −1.75 | −38.45 |
| Peak Heat Release Rate | 230 | 214 | 204 | 221 |
| R-value | 7.96/inch 1.377 m$^2$K/W | 8.18/inch 1.415 m$^2$K/W | 8.16/inch 1.411 m$^2$K/W | 6.72/inch 1.162 m$^2$K/W |
| Predicted Flame Spread Index | 19.3 | 18.6 | 17.5 | 18.4 |
| Predicted Smoke Index | 38 | 34 | 32 | 18 |

| Example 5 - Run | 27 | 28 | 29 | 30 |
|---|---|---|---|---|
| E-300 | — | 1.94 wt % | 0.47 wt % | — |
| BHEDS | 5.34 wt % | — | — | 4.15 wt % |
| RB-79 | — | 11.40 wt % | — | 11.67 wt % |
| DBAA | 17.42 wt % | — | 9.50 wt % | 3.31 wt % |
| Br$_3$neopentylOH | 1.12 wt % | 8.22 wt % | 10.13 wt % | 0.54 wt % |
| Density | 2.01 lb/ft$^3$ (32.2 kg/m$^3$) | 2.12 lb/ft$^3$ (34.0 kg/m$^3$) | 2.01 lb/ft$^3$ (32.2 kg/m$^3$) | 2.25 lb/ft$^3$ (36.0 kg/m$^3$) |
| Compressive Strength | 12.8 psi (0.88 × 10$^5$ Pa) | 20.5 psi (1.41 × 10$^5$ Pa) | 17.5 psi (1.71 × 10$^5$ Pa) | 24.3 psi (1.68 × 10$^5$ Pa) |
| Dimensional Stability* (vol. change) | −18.63 | 0.52 | 2.72 | 2.08 |
| Peak Heat Release Rate | 177 | 209 | 203 | 222 |
| R-value | 7.60/inch 1.314 m$^2$K/W | 7.59/inch 1.313 m$^2$K/W | 8.0/inch 1.383 m$^2$K/W | 7.95/inch 1.375 m$^2$K/W |
| Predicted Flame Spread Index | 18.2 | 19.9 | 17.2 | 18.7 |
| Predicted Smoke Index | 39 | 45 | 50 | 34 |

*Dimensional stability was measured at 70° C. for 14 days at 95% RH.

TABLE C-5

| Example 5 - Run | 31 | 32 | 33 | 35 |
|---|---|---|---|---|
| E-300 | 9.88 wt % | 9.79 wt % | 6.48 wt % | 8.89 wt % |
| BHEDS | 10.20 wt % | 10.11 wt % | 5.42 wt % | 3.35 wt % |
| RB-79 | 0.94 wt % | 0.94 wt % | 7.57 wt % | — |
| DBAA | — | — | — | 3.95 wt % |
| Br$_3$neopentylOH | — | — | — | 3.47 wt % |
| Density | 2.21 lb/ft$^3$ (35.4 kg/m$^3$) | 2.28 lb/ft$^3$ (36.5 kg/m$^3$) | 2.51 lb/ft$^3$ (40.2 kg/m$^3$) | 2.26 lb/ft$^3$ (36.2 kg/m$^3$) |
| Compressive Strength | 26.5 psi (1.83 × 10$^5$ Pa) | 28.1 psi (1.94 × 10$^5$ Pa) | 28.4 psi (1.96 × 10$^5$ Pa) | 28.7 psi (1.98 × 10$^5$ Pa) |
| Dimensional Stability* (vol. change) | 0.91 | 0.67 | 1.08 | 3.25 |
| Peak Heat Release Rate | 246 | 245 | 210 | 230 |
| R-value | 7.61/inch 1.316 m$^2$K/W | 7.79/inch 1.347 m$^2$K/W | 7.95/inch 1.375 m$^2$K/W | 7.57/inch 1.309 m$^2$K/W |
| Predicted Flame Spread Index | 21.6 | 21.3 | 16.3 | 18.6 |
| Predicted Smoke Index | 30 | 19 | 22 | 23 |

| Example 5 - Run | 34 | 36 | 37 | 38 |
|---|---|---|---|---|
| E-300 | 7.97 wt % | 0.19 wt % | 4.20 wt % | 2.97 wt % |
| BHEDS | 0.03 wt % | 0.84 wt % | 2.28 wt % | 1.67 wt % |
| RB-79 | 6.71 wt % | 10.17 wt % | 5.09 wt % | 3.32 wt % |
| DBAA | 6.80 wt % | 9.46 wt % | 4.83 wt % | 3.30 wt % |
| Br$_3$neopentylOH | — | — | 7.31 wt % | 2.15 wt % |
| Density | 2.13 lb/ft$^3$ (34.1 kg/m$^3$) | 2.07 lb/ft$^3$ (33.2 kg/m$^3$) | 2.33 lb/ft$^3$ (37.3 kg/m$^3$) | 2.19 lb/ft$^3$ (35.1 kg/m$^3$) |
| Compressive Strength | 20.5 psi (1.41 × 10$^5$ Pa) | 20.5 psi (1.41 × 10$^5$ Pa) | 27.0 psi (1.86 × 10$^5$ Pa) | 27.4 psi (1.89 × 10$^5$ Pa) |
| Dimensional Stability* (vol. change) | 1.58 | 0.39 | −3.21 | −3.99 |
| Peak Heat Release Rate | 208 | 215 | 209 | 203 |
| R-value | 7.68/inch 1.328 m$^2$K/W | 7.79/inch 1.347 m$^2$K/W | 8.07/inch 1.396 m$^2$K/W | 7.77/inch 1.344 m$^2$K/W |
| Predicted Flame Spread Index | 17.2 | 22.3 | 16.2 | 17.2 |
| Predicted Smoke Index | 29 | 41 | 34 | 15 |

*Dimensional stability was measured at 70° C. for 14 days at 95% RH.

Additional embodiments of this invention include, without limitation:

A) A flame retardant composition comprised of or formed from components comprising at least one isocyanate-reactive sulfur-containing compound and at least one isocyanate-reactive brominated flame retardant, with the proviso that when the isocyanate-reactive sulfur-containing compound is a sulfur-containing aromatic diamine and the isocyanate-reactive brominated flame retardant is a brominated aromatic diester diol, the composition also comprises another brominated flame retardant, another sulfur-containing compound, tris(1-chloro-2-propyl)phosphate, and/or a surface-modified montmorillonite nanoclay.

B) A flame retardant composition as in A) wherein the isocyanate-reactive brominated flame retardant is 2,3-dibromoallyl alcohol, tribromoneopentyl alcohol, and/or a brominated aromatic diester diol.

C) A flame retardant composition as in A) wherein the isocyanate-reactive sulfur-containing compound is a sulfur-containing aromatic diamine, wherein the isocyanate-reactive brominated flame retardant is a brominated aromatic diester diol, wherein the composition further comprises tris(1-chloro-2-propyl)phosphate, and optionally a surface-modified montmorillonite nanoclay, and wherein:

the sulfur-containing aromatic diamine is in the range of about 0.5 wt % to about 10 wt %;

the brominated aromatic diester diol is in the range of about 5 wt % to about 30 wt %; and tris(1-chloro-2-propyl) phosphate is in the range of about 50 wt % to about 90 wt %;

and optionally a surface-modified montmorillonite nanoclay is in the range of about 0.5 wt % to about 5 wt %, wherein the wt % are based on the total weight of the composition.

D) A flame retardant composition as in any of A)-C) wherein the sulfur-containing aromatic diamine is a mixture of 3,5-dimethylthio-toluene-2,4-diamine and 3,5-dimethylthio-toluene-2,6-diamine.

E) A formulation comprising at least one polyol, at least one blowing agent, at least one catalyst, at least one surfactant, at least one isocyanate-reactive sulfur-containing compound, and at least one isocyanate-reactive brominated flame retardant, with the proviso that when the isocyanate-reactive sulfur-containing compound is a sulfur-containing aromatic diamine and the isocyanate-reactive brominated flame retardant is a brominated aromatic diester diol, the composition also comprises another brominated flame retardant, another sulfur-containing compound, tris(1-chloro-2-propyl)phosphate, and/or a surface-modified montmorillonite nanoclay.

F) A formulation as in E) wherein:
the polyol is a polyether polyol and/or a polyester polyol;
the polyol has a functionality of about 3 to about 7; and/or
the blowing agent is water, 1,1,1,3,3-pentafluoropropane, trans-1-chloro-3,3,3-trifluoropropene, and/or 1,2-bis(trifluoromethyl)ethene.

G) A formulation as in any of E)-F) wherein
the isocyanate-reactive sulfur-containing compound is a sulfur-containing aromatic diamine which is a mixture of 3,5-dimethylthio-toluene-2,4-diamine and 3,5-dimethylthio-toluene-2,6-diamine, in an amount of about 1 wt % to about 20 wt %, based on the total weight of the formulation, or a disulfide in an amount of about 1 wt % to about 15 wt %, based on the total weight of the formulation; and
the isocyanate-reactive brominated flame retardant is selected from the group consisting of brominated aromatic diester diols, 2,3-dibromoallyl alcohol, tribromoneopentyl alcohol, dibromoneopentyl glycol and tetrabromobenzenedimethanol, in an amount of about 1 wt % to about 25 wt %, based on the total weight of the formulation.

H) A formulation as in any of E)-G) wherein the isocyanate-reactive brominated flame retardant is a mixed ester of tetrabromophthalic anhydride with diethylene glycol and propylene glycol.

I) A formulation as in H) further comprising tris(1-chloro-2-propyl)phosphate in an amount of about 20 wt % to about 45 wt %, based on the total weight of the formulation; and optionally a montmorillonite clay surface modified with 0.5 to 5 wt % aminopropyltriethoxysilane and 15 to 35 wt % octadecylamine, in an amount of about 0.5 wt % to about 5 wt %, based on the total weight of the formulation.

J) A formulation as in any of E)-F) wherein the isocyanate-reactive brominated flame retardant is 2,3-dibromoallyl alcohol, and
the isocyanate-reactive sulfur-containing compound is a sulfur-containing aromatic diamine in the range of about 2 wt % to about 15 wt % and 2,3-dibromoallyl alcohol is in the range of about 4 wt % to about 20 wt %; or
the isocyanate-reactive sulfur-containing compound is a disulfide in the range of about 3 wt % to about 12 wt % and 2,3-dibromoallyl alcohol is in the range of about 5 wt % to about 20 wt %,
wherein the wt % are based on the total weight of the composition.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

That which is claimed is:

1. A flame retardant composition comprised of or formed from components comprising
at least one isocyanate-reactive sulfur-containing compound selected from disulfides and sulfur-containing aromatic diamines and
2,3-dibromoallyl alcohol.

2. A flame retardant composition as in claim 1 wherein when the isocyanate-reactive sulfur-containing compound is a sulfur-containing aromatic diamine, the sulfur-containing aromatic diamine is in the range of about 10 wt % to about 45 wt %, and 2,3-dibromoallyl alcohol is in the range of about 50 wt % to about 80 wt %;
when the isocyanate-reactive sulfur-containing compound is a disulfide,
the disulfide is in the range of about 10 wt % to about 55 wt %, and 2,3-dibromoallyl alcohol is in the range of about 45 wt % to about 90 wt %;
wherein the wt % are based on the total weight of the flame retardant composition.

3. A flame retardant composition as in claim 1 wherein the isocyanate-reactive sulfur-containing compound is bis(2-hydroxyethyl)disulfide.

4. A formulation comprising
at least one polyol,
at least one blowing agent,
at least one catalyst,
at least one surfactant, at least one isocyanate-reactive sulfur-containing compound selected from disulfides and sulfur-containing aromatic diamines, and 2,3-dibromoallyl alcohol.

5. A formulation as in claim 4 wherein the polyol is a polyether polyol and/or a polyester polyol.

6. A formulation as in claim 4 wherein the polyol has a functionality of about 3 to about 7.

7. A formulation as in claim 4 wherein the blowing agent is water, 1,1,1,3,3-pentafluoropropane, trans-1-chloro-3,3,3-trifluoropropene, and/or 1,2-bis(trifluoromethyl)ethene.

8. A formulation as in claim 4 wherein the sulfur-containing aromatic diamine is a mixture of 3,5-dimethylthio-toluene-2,4-diamine and 3,5-dimethylthio-toluene-2,6-diamine, and/or the disulfide is bis(2-hydroxyethyl)disulfide.

9. A rigid polyurethane foam formed from components comprising a polyisocyanate and a formulation as in claim 4.

10. A process for forming a rigid polyurethane foam, which process comprises contacting
  A) a polyisocyanate, and
  B) a formulation formed from
    at least one polyol,
    at least one blowing agent,
    at least one catalyst,
    at least one surfactant,
    at least one isocyanate-reactive sulfur-containing compound selected from disulfides and sulfur-containing aromatic diamines, and
    2,3-dibromoallyl alcohol, and
allowing the mixture to cure to form a rigid polyurethane foam.

11. A process as in claim 10 wherein A) and B) are in amounts such that the Isocyanate Index of the mixture is about 85 to about 1000, and wherein a rigid polyurethane foam is formed.

12. A rigid polyurethane foam formed as in claim 10.

* * * * *